United States Patent

Mizoguchi et al.

Patent Number: 5,964,039
Date of Patent: Oct. 12, 1999

[54] CUTTING METHOD AND SAW TOOL

[75] Inventors: Soichiro Mizoguchi; Kunihiko Tatsu; Hidezumi Okamura, all of Hikone; Hideo Hatta, Shiga; Shoichi Hongo, Hikone, all of Japan

[73] Assignee: Matsushita Electric Works, Ltd., Kadoma, Japan

[21] Appl. No.: 08/618,092

[22] Filed: Mar. 19, 1996

Related U.S. Application Data

[63] Continuation of application No. 08/196,066, filed as application No. PCT/JP93/01060, Jul. 28, 1993, abandoned.

[30] Foreign Application Priority Data

| Jul. 28, 1992 | [JP] | Japan | 4-201611 |
| Nov. 20, 1992 | [JP] | Japan | 4-311953 |
| Jan. 29, 1993 | [JP] | Japan | 5-013990 |

[51] Int. Cl.⁶ .............. B27B 19/00; B27B 11/02
[52] U.S. Cl. ............... 30/392; 30/393; 30/124; 83/835
[58] Field of Search .......... 30/393, 392, 502, 30/516, 353, 357, 124, 374; 83/835, 820

[56] References Cited

U.S. PATENT DOCUMENTS

| 3,033,251 | 5/1962 | Atkinson et al. | 30/392 |
| 3,091,851 | 6/1963 | Cummins | 83/392 |
| 3,461,732 | 8/1969 | Gregory | 30/393 |
| 3,477,479 | 11/1969 | Doty | 83/835 |
| 3,680,610 | 8/1972 | Lindgren | 30/502 |
| 3,837,024 | 9/1974 | Saunders | 30/502 |

(List continued on next page.)

FOREIGN PATENT DOCUMENTS

| 986764 | 8/1951 | France | 30/502 |
| 836709 | 5/1952 | Germany | 30/502 |
| 860860 | 12/1952 | Germany . | |
| 30 22 493 | 1/1981 | Germany . | |
| 56-5701 | 1/1981 | Japan . | |
| 59-99702 | 7/1984 | Japan . | |
| 60-85902 | 6/1985 | Japan . | |
| 64-27202 | 2/1989 | Japan . | |
| 2-50301 | 4/1990 | Japan . | |
| 2052376 | 1/1981 | United Kingdom . | |

OTHER PUBLICATIONS

Festo brochure, Compass Saw PS 1E, No. 055197D, with the printing mark 1090/810106 Ma.

*Primary Examiner*—M. Rachuba
*Assistant Examiner*—T. Anthony Vaughn
*Attorney, Agent, or Firm*—Armstrong, Westerman, Hattori, McLeland and Naughton

[57] ABSTRACT

A saw tool comprises a housing for incorporating a driving device therein, a base attached to the housing, a driving arm connected to the driving device to effect a reciprocating orbital motion, and a saw blade attached to the driving arm and extending through a slit in the base. The saw blade has a first saw tooth section formed on a top end thereof for biting a workpiece and a second saw tooth section formed on one side thereof. A rectangular through-hole can be accurately and rapidly formed in a workpiece such as a plaster board or veneer board, etc., with this saw tool. That is, a cutting method of the present invention comprises the steps of biting the workpiece with the first saw tooth section of the saw blade in the reciprocating orbital motion, while pressing a top end of the base and the top end of the saw blade against the workpiece, penetrating the saw blade through the workpiece, and subsequently, cutting the workpiece with the second saw tooth section by moving the saw blade along a cutting line on the workpiece. As a result, a cutting operation of one side of the rectangular through-hole is finished. By repeating the above cutting operation to each side of the rectangular through-hole, the rectangular through-hole is formed in the workpiece without drilling a starting through-hole in the workpiece.

4 Claims, 22 Drawing Sheets

U.S. PATENT DOCUMENTS

| | | | |
|---|---|---|---|
| 3,945,120 | 3/1976 | Ritz | 30/393 |
| 3,977,289 | 8/1976 | Tuke | 30/392 |
| 3,978,862 | 9/1976 | Morrison | 30/393 |
| 4,090,297 | 5/1978 | Wanner et al. | 30/124 |
| 4,188,952 | 2/1980 | Loschilov | 30/355 |
| 4,255,858 | 3/1981 | Getts . | |
| 4,318,224 | 3/1982 | Getts . | |
| 4,327,621 | 5/1982 | Vorhees et al. | 83/820 |
| 4,379,362 | 4/1983 | Getts . | |
| 4,414,743 | 11/1983 | Pioch et al. | 30/124 |
| 4,819,334 | 4/1989 | Mongeon | 30/393 |
| 5,012,583 | 5/1991 | Blochle et al. | 30/124 |
| 5,201,749 | 4/1993 | Sachse et al. | 30/393 |
| 5,295,426 | 3/1994 | Planchon | 30/392 |
| 5,517,889 | 5/1996 | Logan | 83/835 |

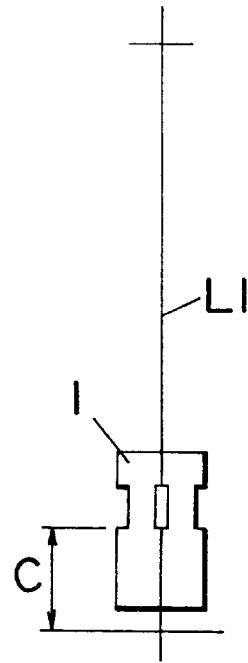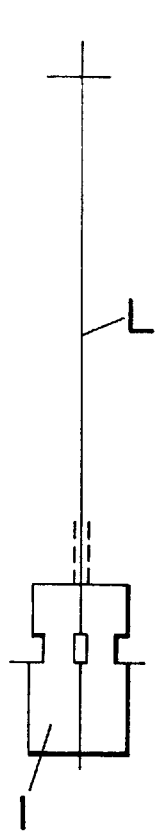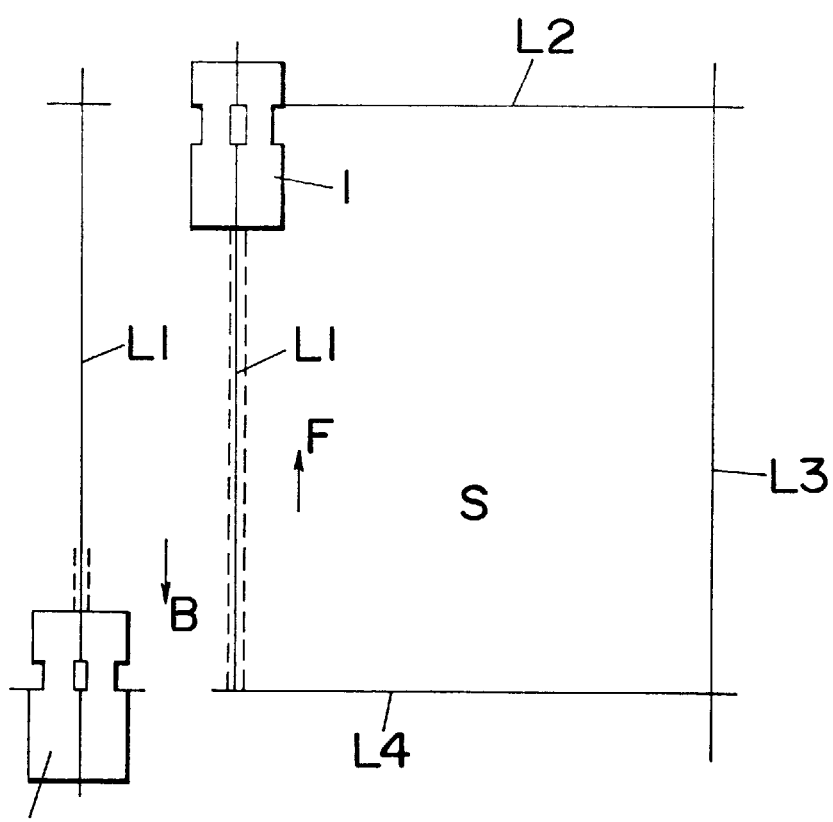

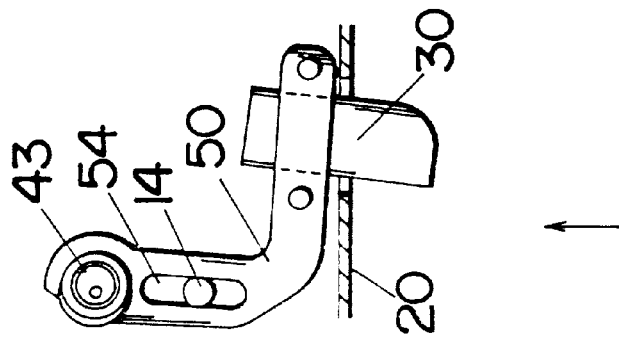
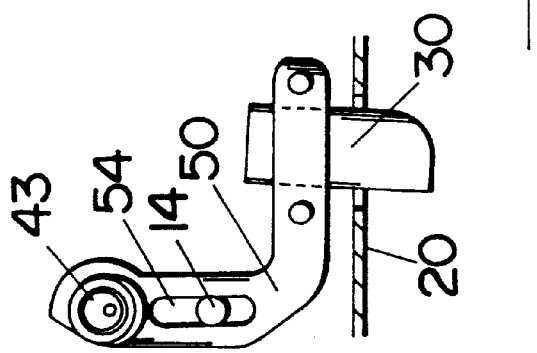
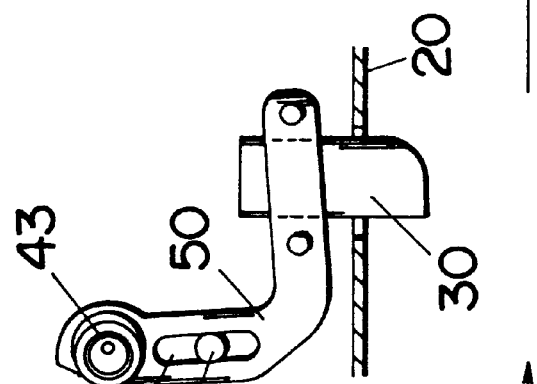
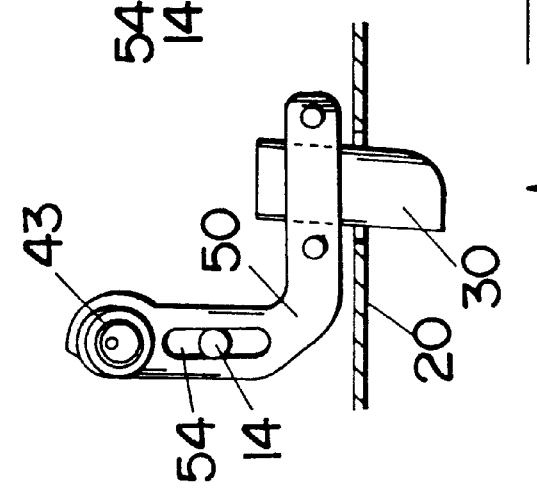

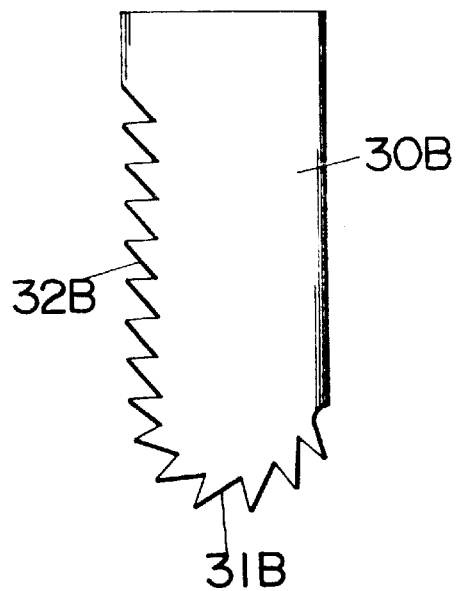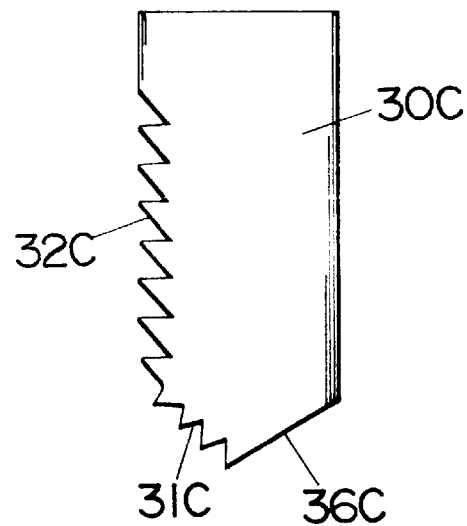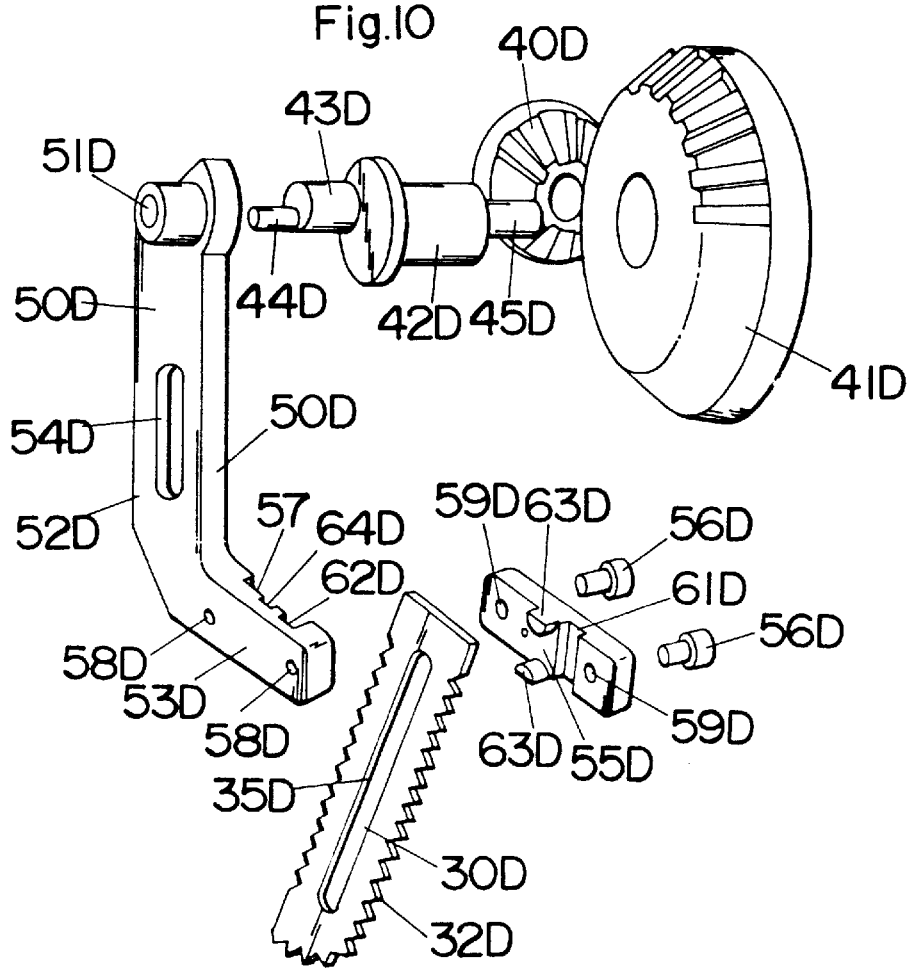

CUTTING SPEED (mm/s)

LM

LK

THICKNESS OF SAW TOOTH (mm)

SAWDUST AMOUNT (g/m)

LM

LK

THICKNESS OF SAW TOOTH (mm)

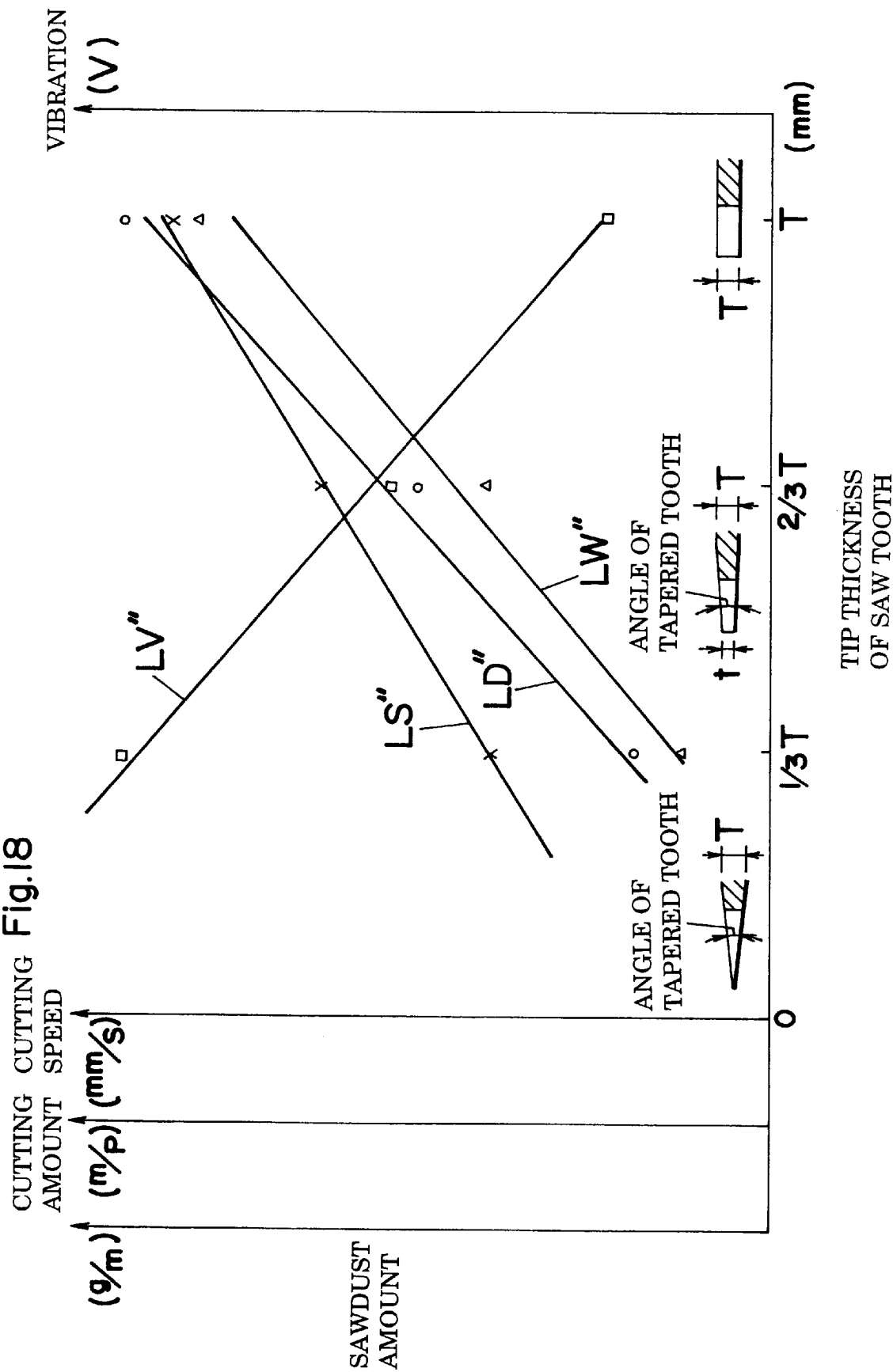

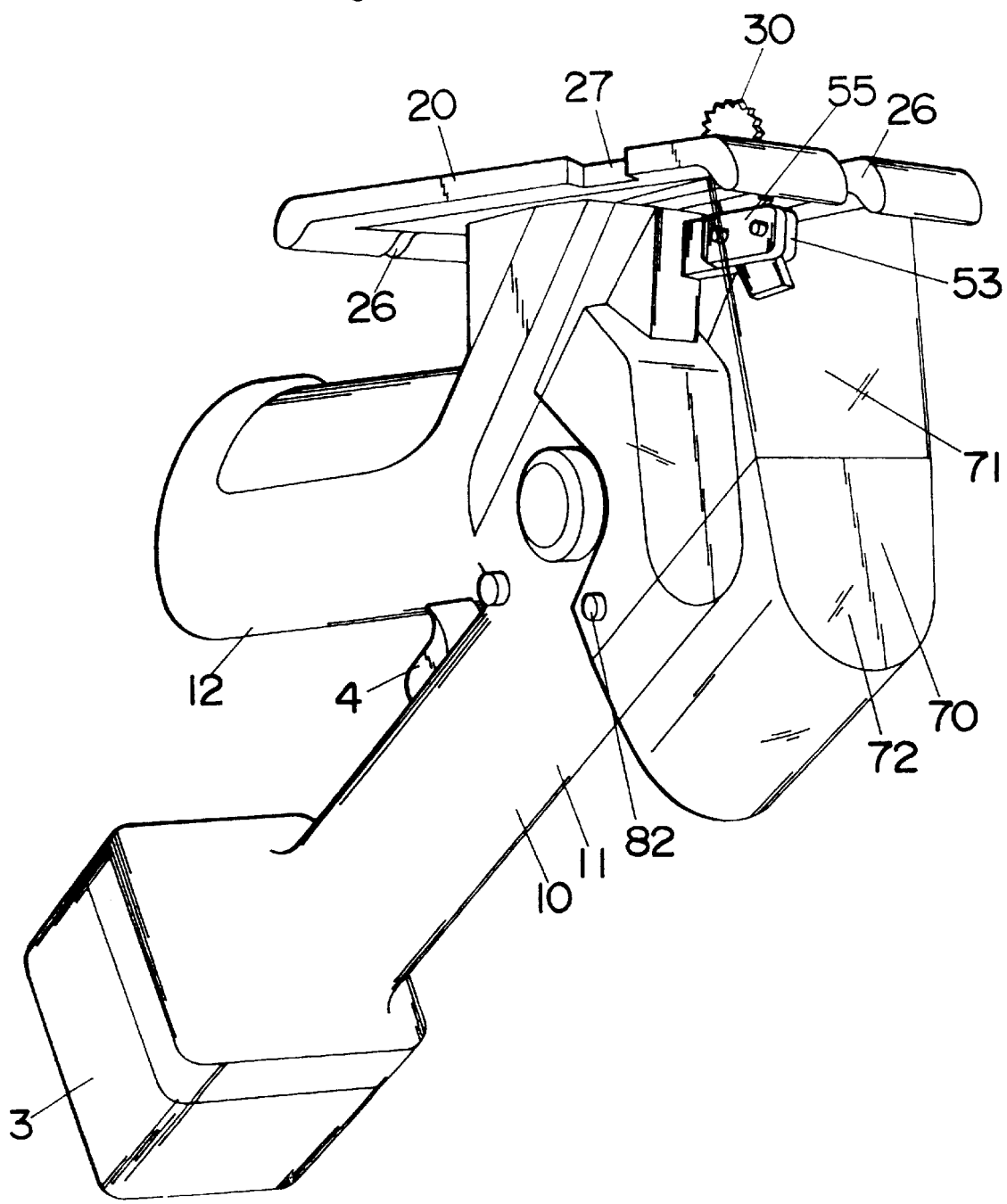

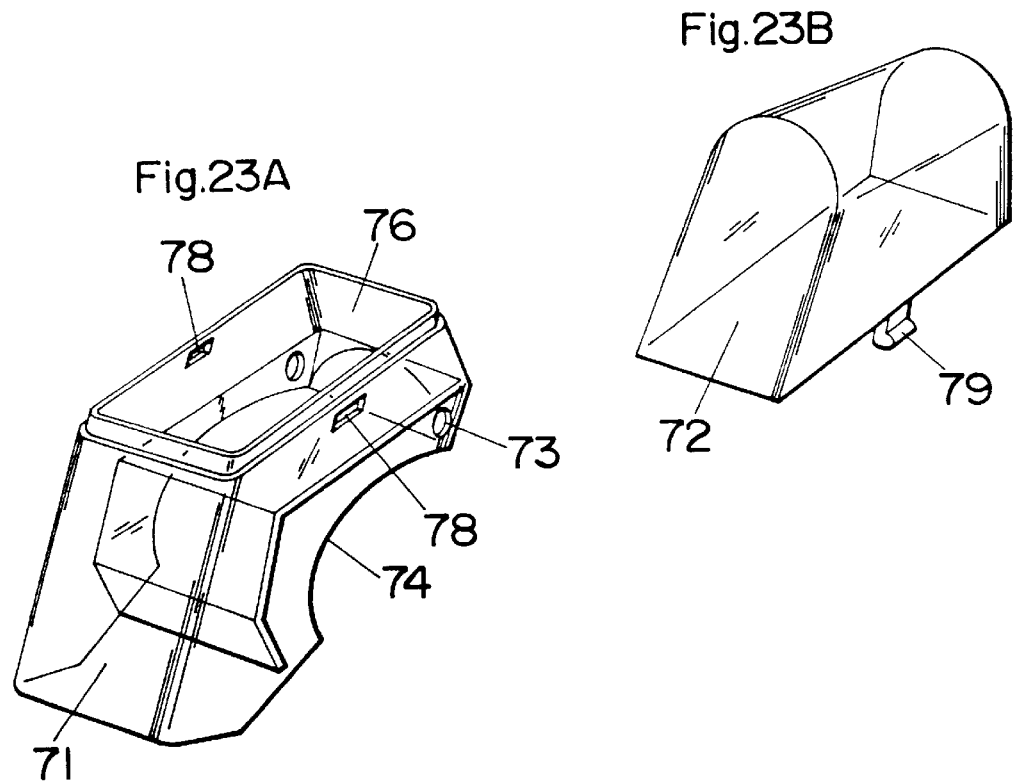
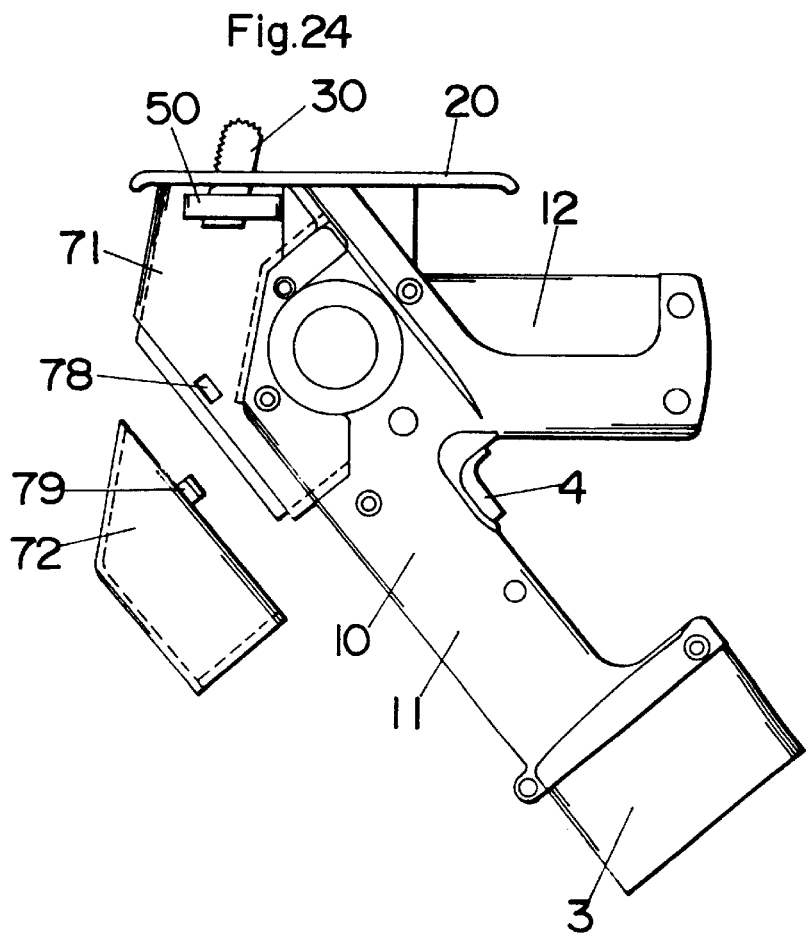

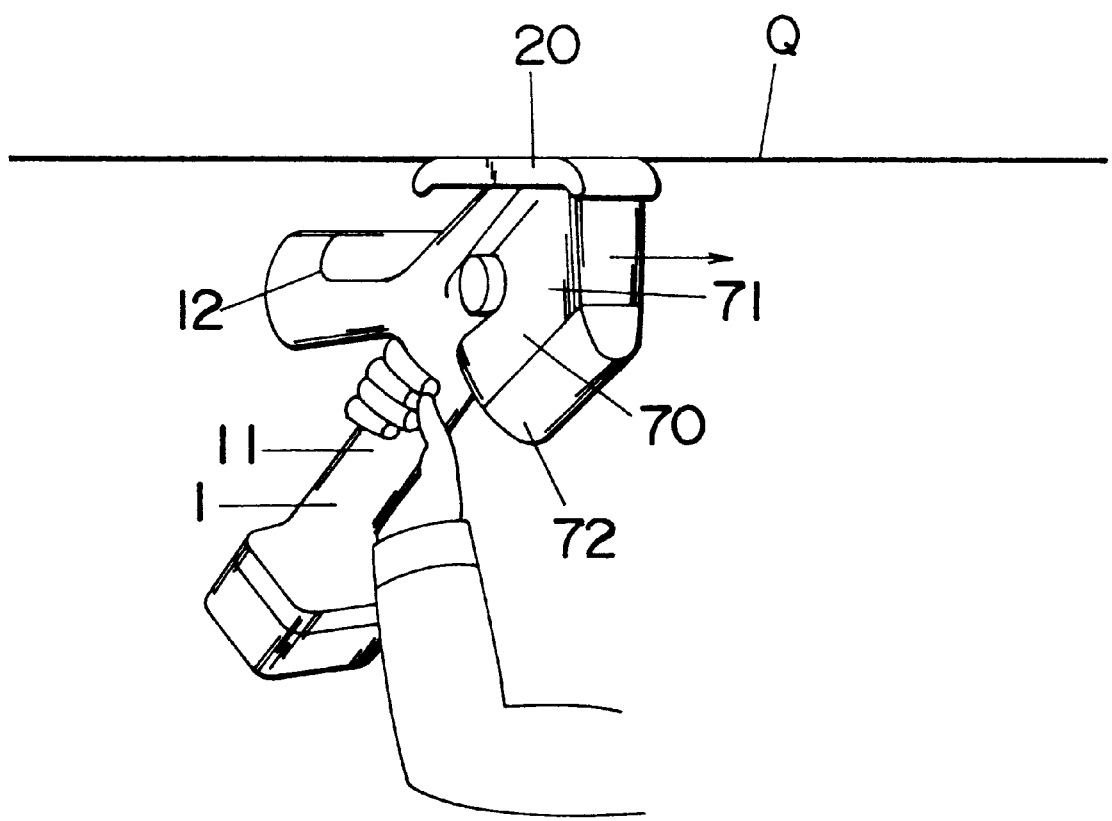

CUTTING METHOD AND SAW TOOL

This application is a continuation of application Ser. No. 08/196,066 filed Sep. 7, 1994, now abandoned; which is a 371 of PCT/JP93/01060 filed Jul. 28, 1993.

BACKGROUND OF THE INVENTION

1. Field of the Invention

The present invention relates to a method of cutting a board-like workpiece, such as a plaster board or veneer board, etc., and a saw tool for practicing the method.

2. Disclosure of the Prior Art

In the past, various kinds of electric saws have been used for cutting a board material, such as a plaster board or veneer board. For example, when a rectangular through-hole is formed in a veneer board with an electric saw of Utility Model Japanese Patent Publication No. 1-26402 that gives a reciprocating orbital motion to a saw blade thereof, a starting through-hole having a diameter large enough to penetrate the saw blade through the veneer board is first drilled in the veneer board, and then the veneer board is cut with the saw blade penetrating through the veneer board. However, such a formation of the starting through-hole needs an excess of working time and also creates difficulty in producing an accurate cutting operation.

As shown in FIGS. 27A to 27C, Utility Model Japanese Patent Publication No. 58-26751 discloses a saw blade 30P having a unique blade shape that is used when a window-like hole is formed in a polystyrene board or an insulation fiber board without forming a starting through-hole in the board. The saw blade 30P comprises a saw tooth section 31P, a back 32P and an inclined knife edge 33P extending from the lower end of the saw tooth section 31P to the lower end of the back 32P. Since the polystyrene board or the insulation fiber board may include wooden chips or bits of down and otherwise is a soft board material from the viewpoint of cutting resistance, the saw blade 30P can readily penetrate through the soft board material by pressing the knife edge 33P of the saw blade 30P against the soft board material while reciprocating the saw blade 30P up and down. Subsequently, the soft board material is cut by the saw tooth section 31P to form the window-like hole therein.

However, because plaster board and veneer board is a harder material and has greater cutting resistance than soft board material, it is difficult to penetrate such a knife edge 33P through this material. Additionally, there is a probability of causing serious injury to the worker by a broken saw blade 30P in this case.

In addition, since the saw tooth section 31P is formed on one side of the saw blade 30P, only a one-way cutting operation is allowed. That is, in case of accurately forming a window-like hole in a board with the saw blade 30P without forming a starting hole in the board, the saw blade 30P is first caused to penetrate the board at an optional position of a cutting line on the board, and then the board is cut by advancing the saw blade 30P from the position to an end of the cutting line. Subsequently, the saw blade 30P is pulled out from the board, turned to the opposite direction, caused to penetrate the board again, and advanced from the position to the other end of the cutting line. In this case, although it is not necessary to form the starting hole in the board, the problem of requiring an excess of working time is not sufficiently improved.

SUMMARY OF THE INVENTION

For improving the above conditions, it is a primary object of the present invention to provide a cutting method for forming a window-like hole in a workpiece, such as a plaster board or veneer board, etc., accurately and efficiently without forming a starting through-hole in the workpiece, and also a saw tool for practicing the cutting method. That is, the cutting method of the present invention uses a saw blade having a first saw tooth section at one end of the blade for biting the workpiece, a second saw tooth section at one side of the blade, and a saw tool that produces a reciprocating orbital motion to the saw blade. The cutting method of the present invention comprises two consecutive steps of biting the workpiece with the first saw tooth section of the saw blade as a first step until the saw blade penetrates the workpiece and thereafter cutting the workpiece with the second saw tooth section of the saw blade as a second step.

The saw tool for performing the cutting method of the present invention includes a housing for enclosing a driving device therein, a base fixed to the housing, a driving arm on which the reciprocating orbital motion is imparted by the driving device, and the saw blade attached to the driving arm so as to project from a slit formed in the base. The saw blade has the first and second saw tooth sections.

In a preferred embodiment of the present invention, the saw blade further includes a third saw tooth section that is formed on the opposite side of the second saw tooth section of the saw blade. The third saw tooth section is formed with saw teeth inclined in the opposite direction of saw teeth of the second saw tooth section. Therefore, a continuous cutting operation can be efficiently performed because the workpiece is cut with the third saw tooth section of the saw blade by advancing the saw tool in the opposite direction of moving the saw tool for cutting the workpiece with the second saw tooth section without pulling the saw blade out from the workpiece for reversing the cutting direction.

BRIEF DESCRIPTION OF THE DRAWINGS

In FIGS. 3A to 3C.

In FIGS. 5A to 5E.

FIGS. 7A to 7C explain a method of cutting a workpiece along a cutting line thereon with an electric saw of the present invention for forming a window-like hole therein;

FIGS. 8A to 8D are conceptual diagrams illustrating a reciprocating orbital motion of a saw blade fixed to a driving arm;

FIGS. 9A and 9B are side elevational views of saw blades of other embodiments of the present invention;

FIG. 10 is an exploded perspective view of a driving device to which a saw blade having an elongate blade hole is attached;

In FIGS. 12A to 12C.

FIG. 18 is a graph illustrating the result of cutting tests for examining an adequate top thickness of saw teeth of a saw blade;

FIG. 22 is a perspective view of an electric saw having a sawdust case for cutting a ceiling board;

FIGS. 23A and 23B are perspective views of a tubular case and a detachable cover of the sawdust case, respectively;

FIG. 24 is a side elevational view of the electric saw for explaining how to attach the detachable cover to the tubular case fixed to the electric saw;

FIG. 25 shows a cutting operation of the ceiling board with an electric saw having a sawdust case;

In FIGS. 26A to 26C.

DETAILED DESCRIPTION OF THE PREFERRED EMBODIMENT

The present invention is explained in detail in accordance with the attached drawings.

Figure 1:
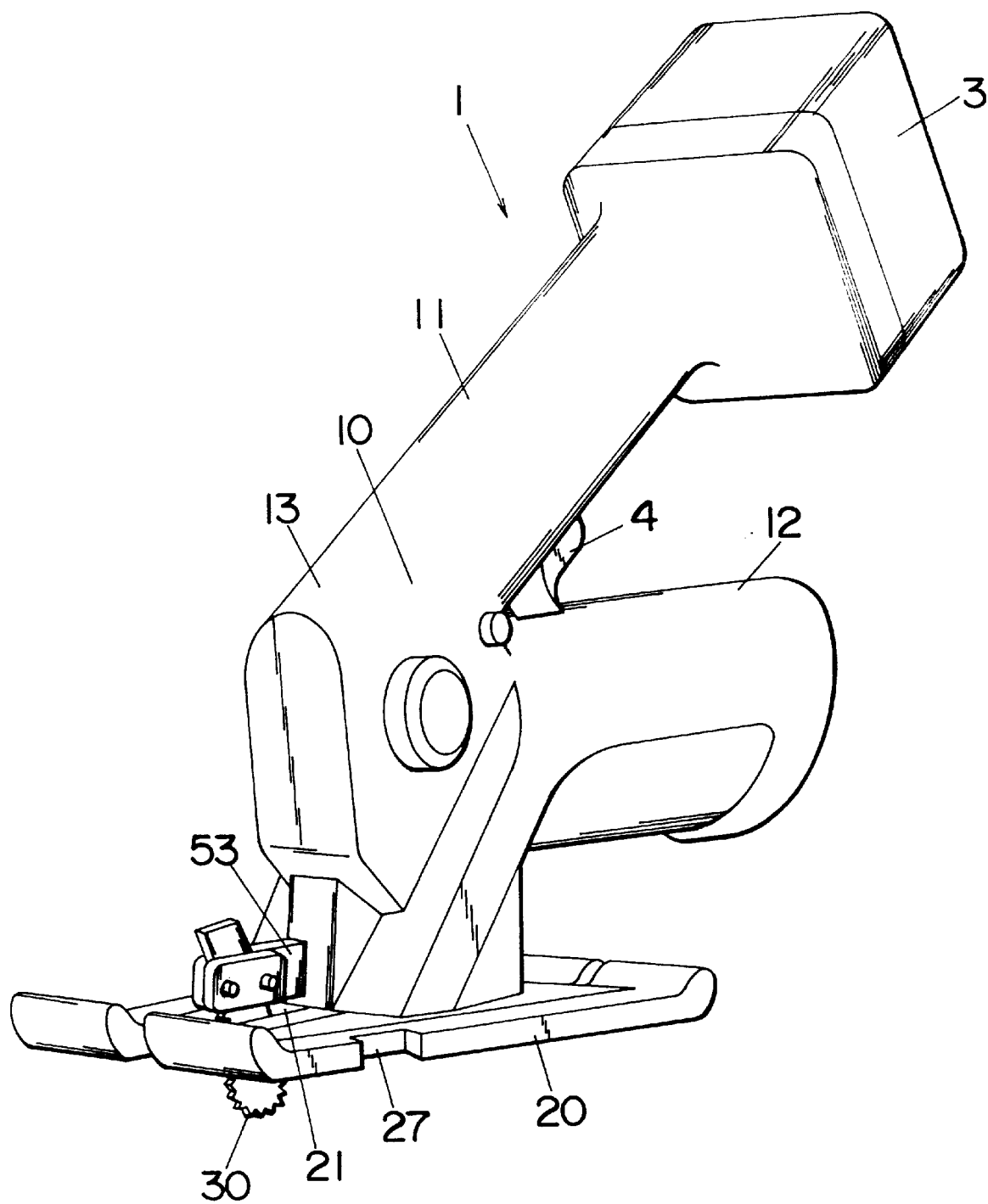
FIG. 1 is a perspective view of an electric saw of the present invention.
Figure 2:
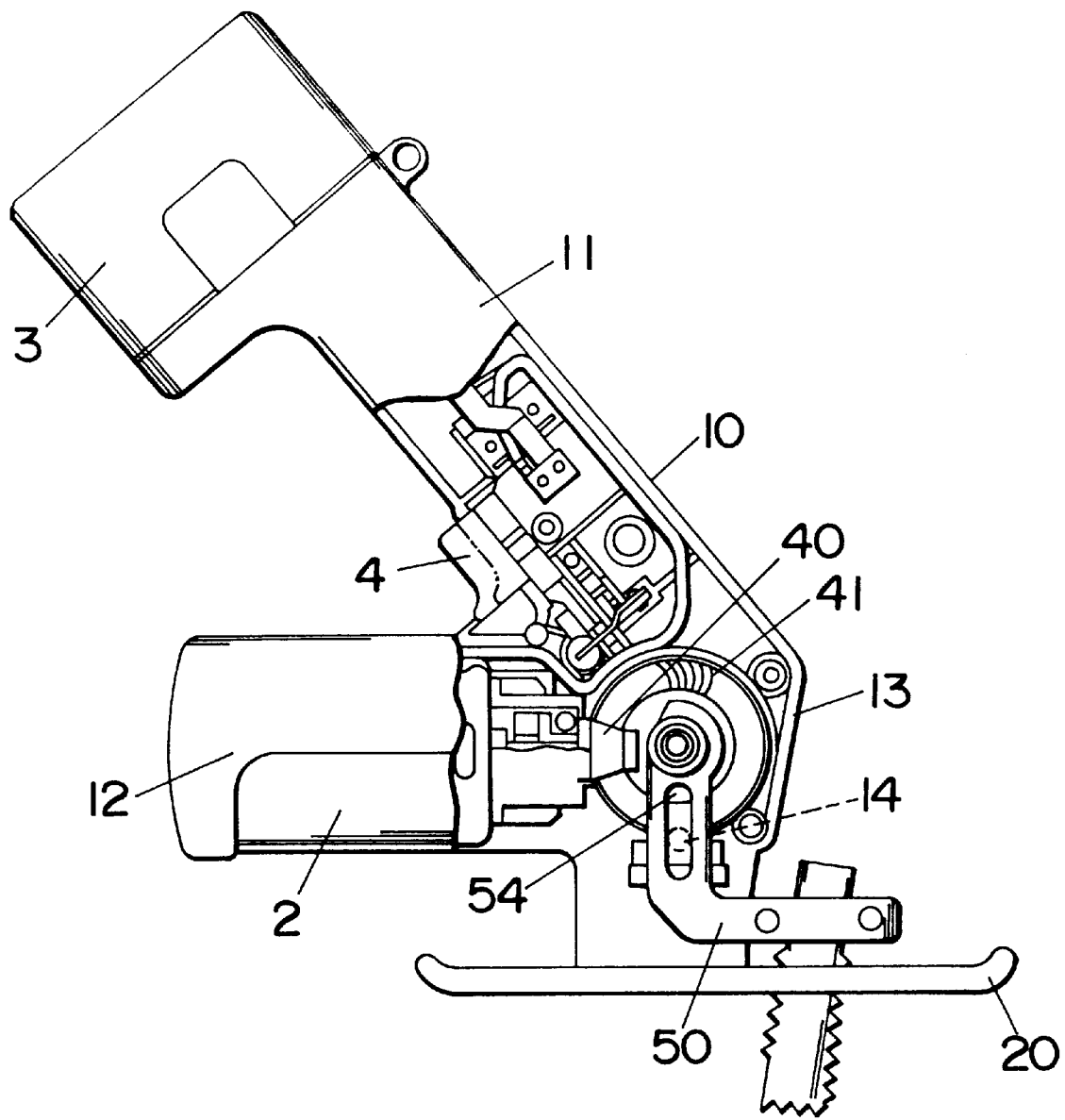
FIG. 2 is a side elevational view including a partially cross-sectional view of the electric saw of FIG. 1.
Figure 3A:
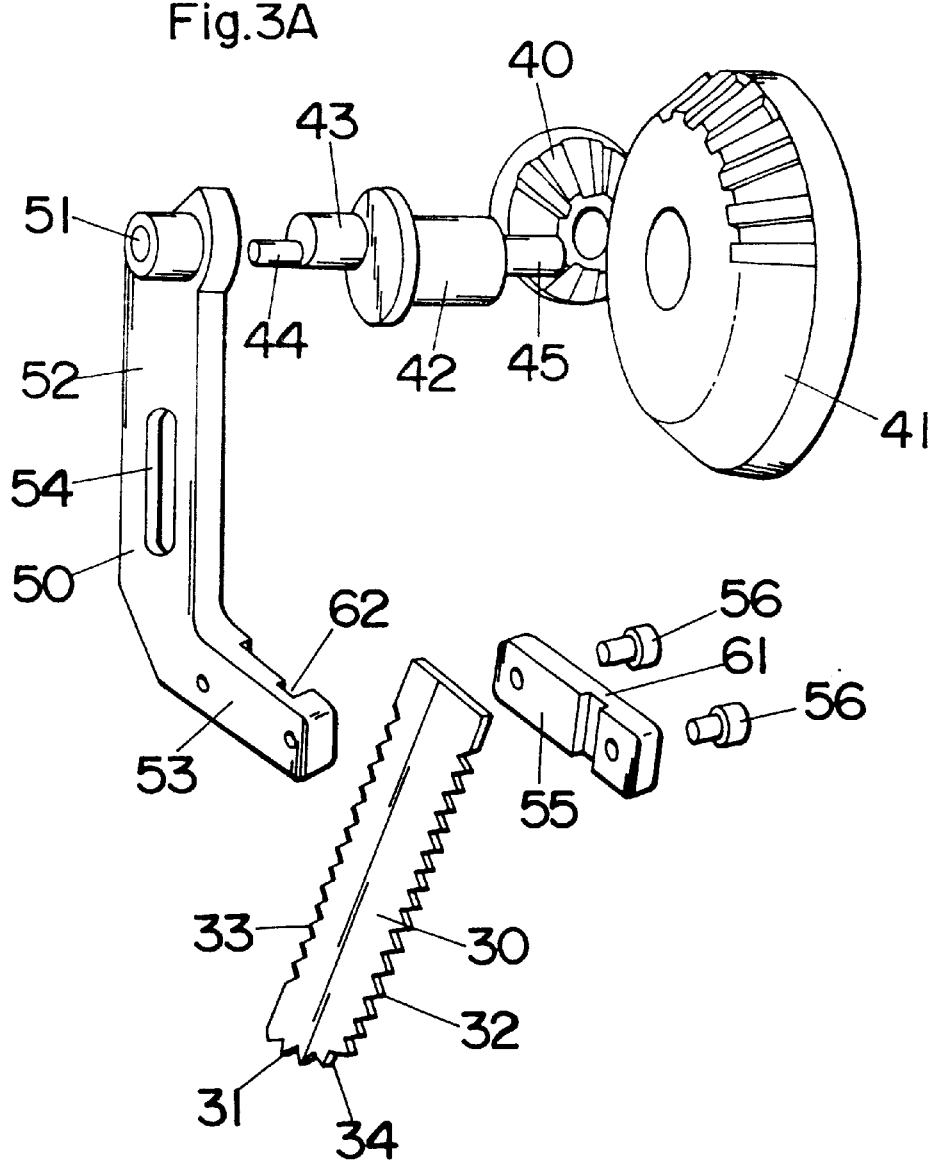
FIG. 3A is an exploded perspective view of a driving device of the electric saw.
Figure 3B:
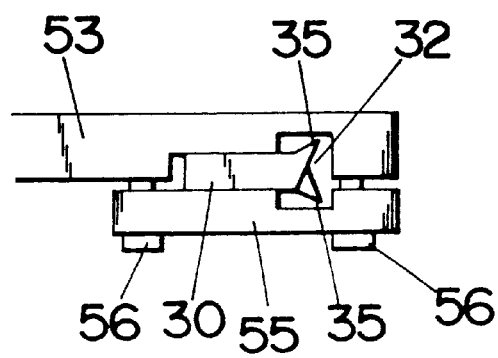
FIG. 3B shows a saw blade fixed to a driving arm.
Figure 3C:
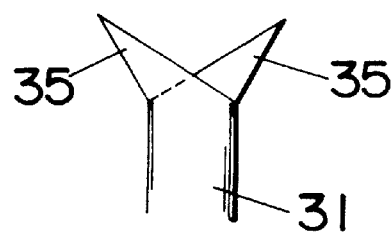
FIG. 3C is an end view of the saw teeth illustrating the set of the saw teeth.

As shown in FIGS. 1 and 2, an electric saw 1 of the present invention includes a housing 10 for enclosing a motor 2 therein, a base 20 attached to the bottom face of the housing, and a saw blade 30 that is driven by the motor 2 to obtain a reciprocating orbital motion thereof The housing 10 is formed with a grip 11 extending in an inclined direction against the base 20, and a motor case 12 extending in a substantially parallel direction with respect to the base 20. A detachable battery 3 is mounted on the end of the grip 11. A power switch 4 is formed at a corner portion located between the grip 11 and the motor case 12. A driving device for providing the reciprocating orbital motion of the saw blade, that is shown in FIG. 3A, is contained in a forward end portion 13 of the housing 10. That is, the driving device comprises a first bevel gear 40 rotated by the motor, a second bevel gear 41 engaged with the first bevel gear 40, a rotating shaft 42 fixed to the second bevel gear 41, an eccentric cam 43 integrally formed with the rotating shaft in an eccentric relation with the axis of the rotating shaft, and a driving arm 50 having an engaging hole 51 that is rotatively engaged with the eccentric cam 43. Supporting rods (44, 45) formed at the opposite ends of the rotating shaft 42 are rotatively supported in the forward end portion 13 of the housing 10. The driving arm 50 has a substantial L-shape including a vertical portion 52 and a horizontal portion 53. The vertical portion 52 has an elongated hole 54 extending in the longitudinal direction thereof. A fulcrum 14 for the reciprocating orbital motion is formed on the interior surface of the forward end portion 13 of the housing 10 and placed within the elongated hole 54 of the driving arm 50. The saw blade 30 is fixed between the horizontal portion 53 of the driving arm 50 and a saw blade supporting member 55 by blade screws 56. The horizontal portion 53 of the driving arm projects from the forward end portion 13 of the housing 10. The saw blade 30 projects downwardly from the horizontal portion 53 through a slit 21 in the base 20. The saw blade 30 is generally rectangular having a first saw tooth section 31 at one end thereof, and second and third saw tooth sections (32, 33) on opposite sides extending in the longitudinal direction thereof. The saw blade of FIG. 3A further includes an arcuate saw tooth section 34 at the intersection of the first saw tooth section 31 and the second saw tooth section 32. A radius of curvature of the arcuate saw tooth section 34 is about half the width of the saw blade 30. In addition, the teeth of the second saw tooth section 32 are formed with a saw set 35, as shown in FIG. 3C, by which cutting of a wood material is effectively enhanced. For preventing breakage of the saw set 35 when fixing the saw blade 30 between the driving arm 50 and the supporting member 55, saw set clearance grooves (61, 62) are respectively formed in the supporting member 55 and the horizontal portion 53 of the driving arm 50, as shown in FIG. 3B. In the illustrated example, each of the first and third saw tooth sections (31, 33) is not formed with a saw set 35 in order to reduce cutting resistance.

Upon activating the above-explained driving device, when starting the motor 2, the saw blade 30 fixed to the horizontal portion 53 of the driving arm 50 performs a reciprocating motion in the longitudinal direction thereof and an oscillatory motion in a cutting direction. As a result, a top edge of each saw tooth of the saw blade 30 moves along an elliptical orbit, as shown in FIG. 4, in which "X"

indicates the displacement of the top edge of the saw tooth in a vertical direction and "Y" indicates the displacement of the top edge in a horizontal direction. The saw blade 30 should be fixed to the horizontal portion 53 of the driving arm 50 such that the longitudinal direction of the saw blade 30 is perpendicular with respect to the base 20 when the driving arm 50 is at the forward end position of the elliptical orbit. Since a thusly fixed saw blade 30 results in a vertical cutting section of the workpiece, an accurate cutting operation can be performed without causing an excess of cutting or the remnants of cutting. In the past, a saw blade has been fixed such that the angle of the longitudinal direction of the saw blade against the base is less than a right angle.

Figure 4:
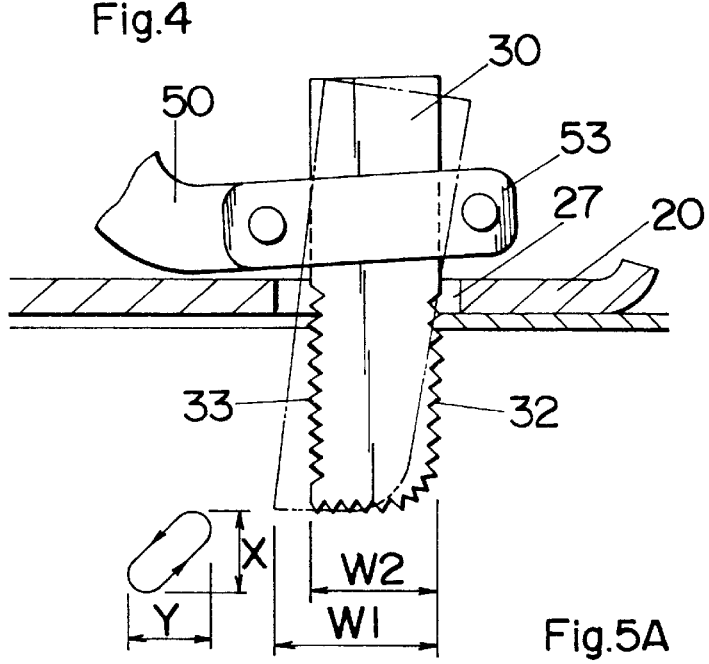
FIG. 4 is a side elevational view of the driving arm with the saw blade.

Accordingly, since a workpiece is cut by the reciprocating orbital motion of the saw blade 30, the actual cutting width W1 is larger than the width W2 of the saw blade, as shown in FIG. 4. Therefore, it is preferred that a recessed portion 27 having the same width as the cutting width W1 be formed in the base 20 for easily performing an accurate cutting operation. In addition, it is possible that a recess portion placed in a side of the base 20 or a mark showing the cutting width W1 be formed in place of the portion 27.

Figure 5A:
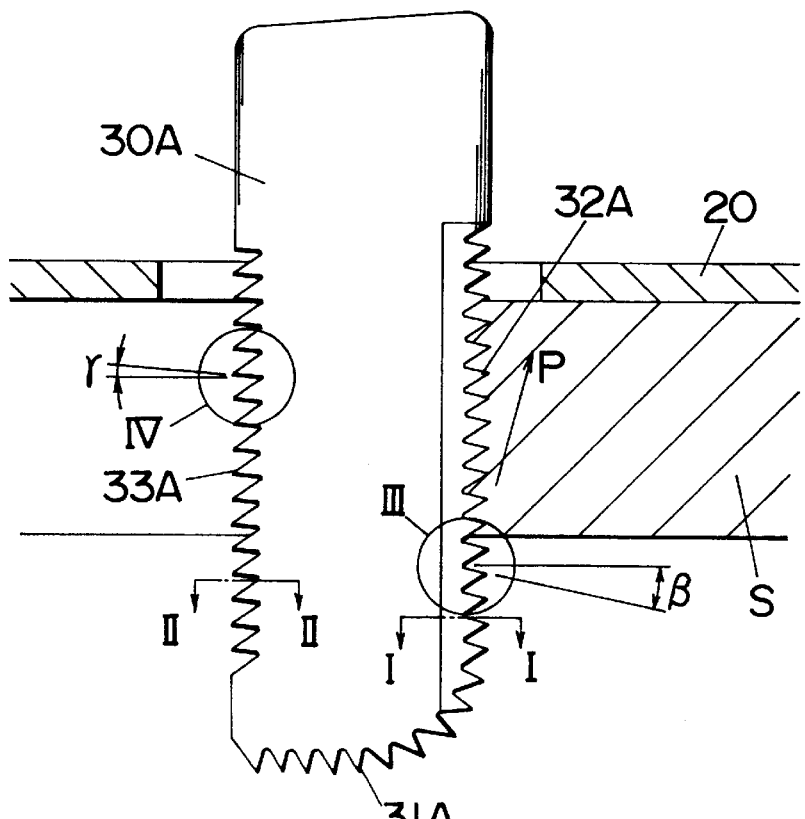
FIG. 5A is a side elevational view showing a saw blade during a cutting operation.
Figure 5B:
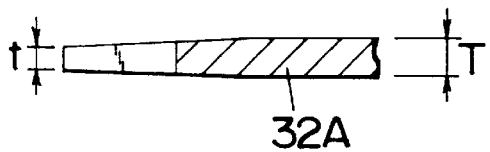
FIG. 5B is a cross-sectional view of a saw tooth at the line I—I of FIG. 5A.
Figure 5C:
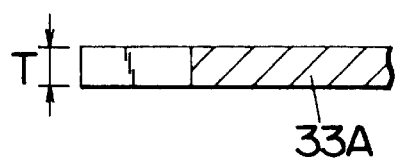
FIG. 5C is a cross-sectional view of a saw tooth at the line II—II of FIG. 5A.
Figure 5D:
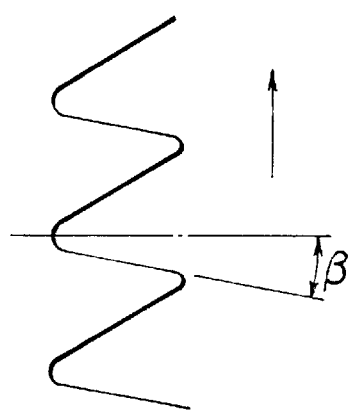
FIG. 5D is an enlarged view of the saw teeth enclosed by the circle III of FIG. 5A.
Figure 5E:
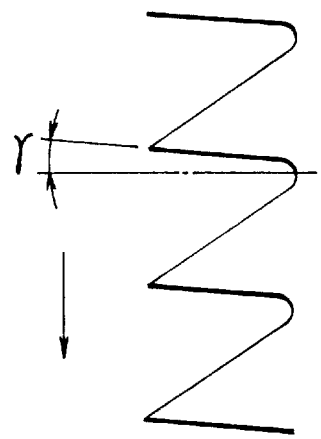
FIG. 5E is an enlarged view of the saw teeth enclosed by the circle IV of FIG. 5A.

Alternatively, it is possible in practice of the present invention to use a saw blade 30A without a saw set in place of the above saw blade 30 used for cutting the wood material, as shown in FIGS. 5A to 5D. A second saw tooth section 32A of the saw blade 30A is formed with saw teeth, each of which is tapered to produce a trapezoid cross-section, as shown in FIG. 5B. Such a second saw tooth section 32A can suppress the occurrence of sawdust during the cutting operation without slowing the cutting speed. In FIG. 5B, a thickness of the point of the saw tooth is given by "t". On the other hand, each of first and third saw tooth sections (31A, 33A) is formed with saw teeth having a constant thickness T thereof, as shown in FIG. 5C. Each of the saw teeth of the second saw tooth section 32A is inclined downwardly at a rake angle $\beta$, as shown in FIG. 5D, so that a workpiece is cut by moving the saw blade 30A upwardly. Therefore, when the saw blade 30A is moved upwardly along a perpendicular direction of a surface S of the workpiece during a reciprocating orbital motion thereof, a force acts on the workpiece in a direction indicated by the arrow P of FIG. 5A from the saw teeth having the rake angle $\beta$ of the second saw tooth section, so that a cutting operation of the workpiece can be smoothly and readily performed without causing vibration of the workpiece. In a saw blade of the prior art, since this rake angle is set to zero, a vertical force acts on the workpiece, so that a relatively large vibration of the workpiece is often generated during a cutting operation. On the other hand, each of the saw teeth of the third saw tooth section 33A, that is formed on the opposite side of the second saw tooth section 32A, is inclined upwardly at a rake angle $\gamma$, as shown in FIG. 5E. Therefore, the workpiece is cut by moving the saw blade 30A downwardly.

Figure 6A:
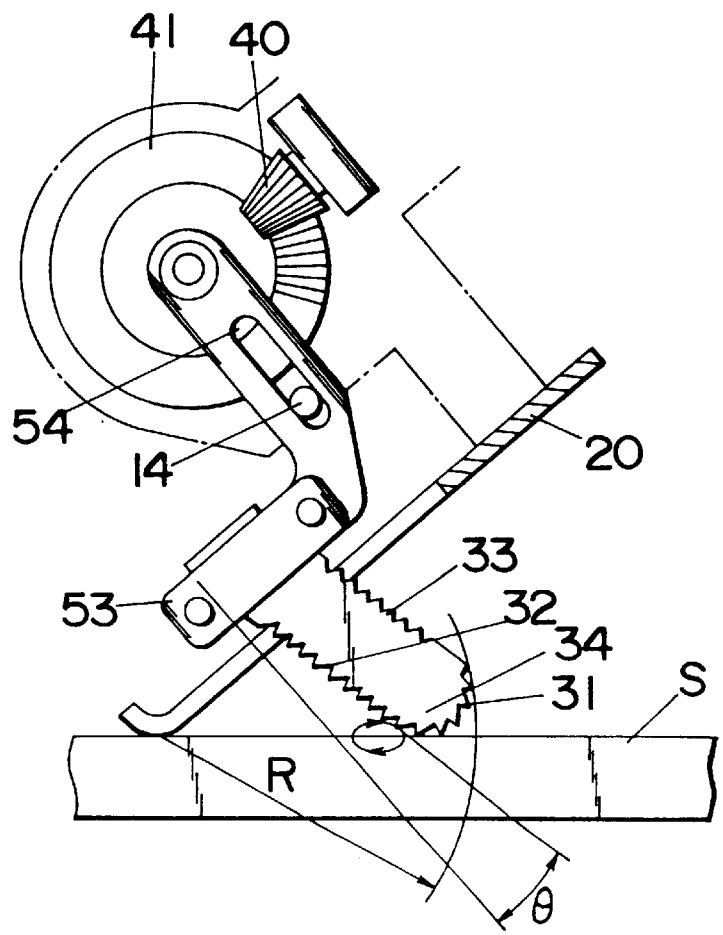
FIGS. 6A to 6C are conceptual diagrams explaining how to penetrate a saw blade through a workpiece.
Figure 6B:
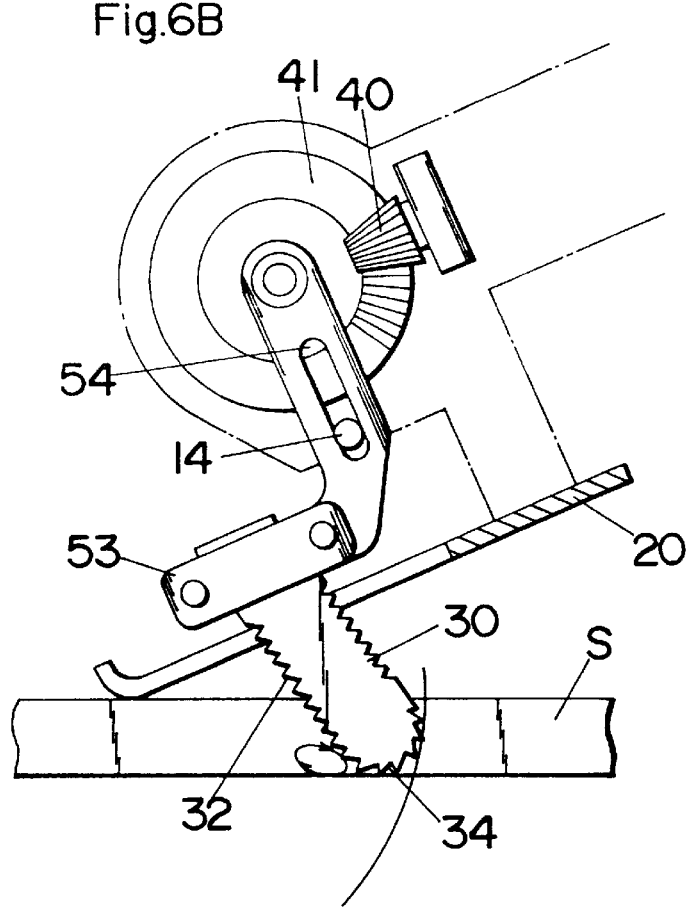
Figure 6C:
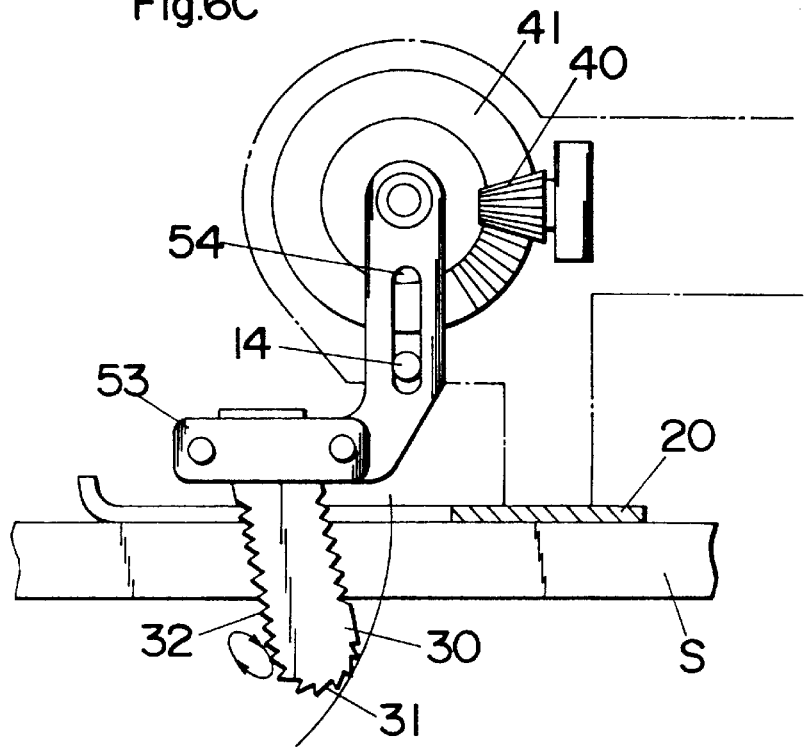

A cutting method for forming a rectangular through-hole in the workpiece without drilling a starting through-hole therein is explained below. As shown in FIGS. 6A and 7A, a forward end of the base 20 and the arcuate saw tooth section 34 of the saw blade 30 are pressed against the cutting line L1 of the workpiece S, and the motor 2 is started, thereby producing the reciprocating orbital motion with an oscillation angle of $\theta$ to the saw blade 30. Thus, the saw blade 30 first takes a bite in the workpiece, and continuously cuts the workpiece from the surface of the workpiece to the inside thereof, as shown in FIG. 6B. Finally, the saw blade 30 passes through the workpiece, as shown in FIG. 6C.

Advantageously, when a part of the cutting line L1 is left in the rear of the electric saw 1, as indicated by "C" of FIG. 7A, it can be cut with the third saw tooth section 33 by moving the electric saw 1 in a backward direction along the cutting line L1, as indicated by the arrow B of FIG. 7B. Then, the cutting operation of the workpiece is continued by advancing the electric saw 1 in a forward direction along the cutting line L1, as indicated by the arrow F of FIG. 7C. In the above explanation, the electric saw 1 is first moved in the backward direction, and subsequently in the forward direction along the cutting line L1. However, of course, it is possible to move the electric saw 1 first in the forward direction, and then in the backward direction for cutting the rest of the cutting line L1. The same cutting method as the above-explained method with respect to the cutting line L1 is performed on each of the cutting lines L2 to L4 of the workpiece to thereby form the rectangular through-hole in the workpiece S. In case of using the saw blade 30 having the arcuate saw tooth section 34, since the number of the saw teeth of the first saw tooth section effectively used for cutting the workpiece is increased as the depth of cut is deeper, the speed of the cutting operation is also gradually increased. In addition, in case of using a saw blade having a relatively narrow width thereof, various cutting operations including a cutting operation along a curved line or V-shaped line can be accurately performed. Moreover, since the above explained cutting operation is performed by moving the electric saw 1 pivotally about a contact line on the forward end of the base 20 with the workpiece, it is necessary to arrange saw teeth, as shown in FIG. 6A, up to the position of the saw blade that is inscribed within the indicated circle having a maximum radius R extending from the forward end of the base 20 to the end of the saw blade, as shown in FIG. 6A.

FIGS. 8A to 8D illustrate one cycle of the reciprocating orbital motion of the driving arm 50. That is, when the rotating shaft 42 is rotated, the eccentric cam 43 produces a reciprocating orbital motion by the action of the fulcrum 14 on the driving arm 50 to thereby cut the workpiece with the saw blade, as shown in the sequence of FIGS. 8A to 8D. In addition, since the longitudinal axis of the saw blade 30 is perpendicular with respect to the base 20 at the forward end position of the saw blade in the cycle of the reciprocating orbital motion, as shown in FIG. 8B, a vertical cutting section of the workpiece is obtained. As a result, it is possible to accurately cut the workpiece over a required length without causing an excess of cutting or the remnants of cutting.

In the present invention, it is also possible to use a saw blade 30B, as shown in FIG. 9A. The saw blade 30B comprises a first saw tooth section 31B arranged at a semicircular end thereof for taking a bite in the workpiece in an initial cutting step and for thereafter passing through the workpiece, and a second saw tooth section 32B arranged at one side thereof for cutting the workpiece along the surface of the workpiece.

On the other hand, when a hard material having relatively large cutting resistance, such as a steel, etc., is selected as the workpiece, it is preferred to utilize a saw blade 30C having a triangular end thereof, as shown in FIG. 9B. The saw blade 30C comprises a second saw tooth section 32C arranged at one side thereof and a first saw tooth section 31C arranged at one side of the triangular end adjacent to the second saw tooth section 32C for taking a bite in the workpiece in an initial cutting step, and for thereafter passing through the workpiece. A saw tooth-free section 36C is arranged at the other side of the triangular end for preventing an interference of the saw tooth to the initial cutting of the workpiece.

Figure 11:
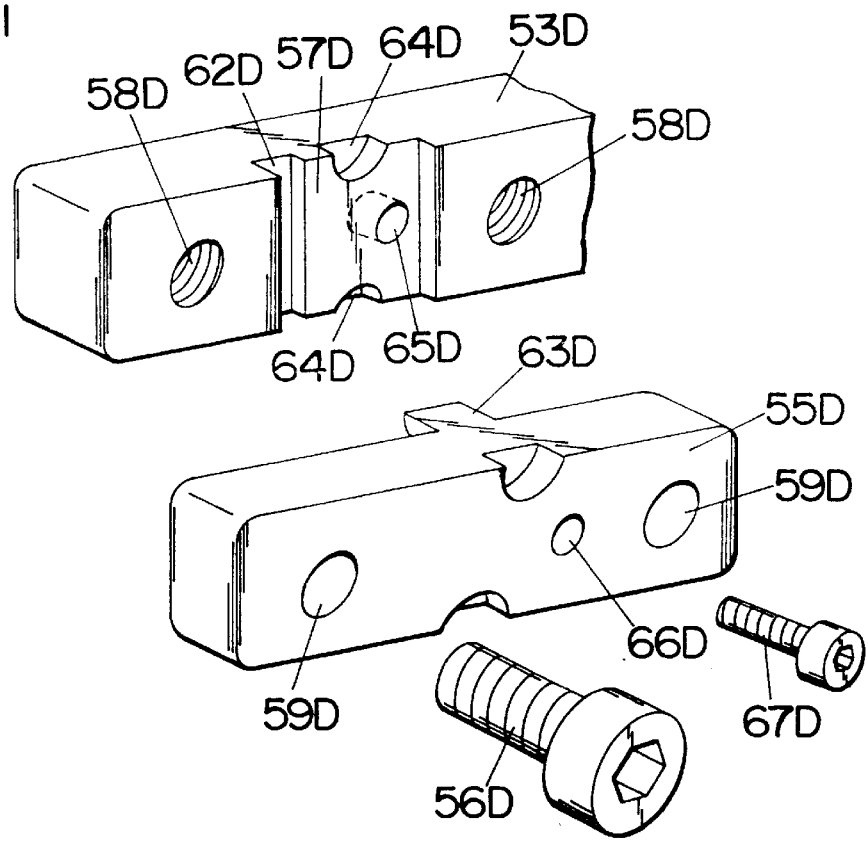
FIG. 11 is an exploded perspective view of a saw blade supporting portion of the driving device of FIG. 10.

FIGS. 10 and 11 explain how to fix a saw blade 30D having an elongate blade hole 35D to a driving arm 50D. A horizontal portion 53D of the driving arm 50D is formed with a pair of first screw holes 58D and a saw blade groove 57D for setting the saw blade 30D therein. On the other hand, a pair of first through-holes 59D is formed in a saw blade supporting member 55D at the corresponding position to the first screw holes 58D of the driving arm 50D. The saw blade 30D is put between the saw blade groove 57D and the supporting member 55D, and is tightly fixed therebetween by engaging blade screws 56D with the first screw holes 58D through the first through-holes 59D. The supporting member 55D further includes a pair of semicircular projections 63D that are arranged along a transverse direction of the supporting member 55D. The projections 63D are placed in the elongate blade hole 35D extending in the longitudinal direction of the saw blade 30D to guide the saw blade 30D. That is, it is possible to flexibly adjust an effective cutting depth of the saw blade 30D by sliding the projections 63D along the elongate blade hole 35D. In addition, since the projections 63D are put in the elongate blade hole 35D of the saw blade 30D, a safe cutting operation is ensured because the saw blade 30D can not fall away from the driving arm 50D during the cutting operation. A pair of semicircular concave recesses 64D are formed in the driving arm 50D at the corresponding position to the semicircular projections 63D of the supporting member 55D so as to fit the projections 63D into the concave recesses 64D to thereby more stably fix the saw blade 30D between the driving arm 50D and the supporting member 55D. Of course, it is possible to adopt other forms of projections in place of the above semicircular projections. Advantageously, when a second saw tooth section 32D of the saw blade 30D is formed with a saw set for enhancing a cutting of a wood material, it is preferred that saw set clearance grooves (61D, 62D) be respectively formed in the supporting member 55D and the horizontal portion 53D of the driving arm 50D. Breakage of the saw set can thereby be effectively prevented by the arrangement of the saw set grooves (61D, 62D).

Additionally, as shown in FIG. 11, it is preferred, in order that the saw blade 30D be more tightly fixed, that a screw 67D engage a second screw hole 65D formed in the saw blade groove 57D through a second through-hole 66D formed in the supporting member 55D at the corresponding position to the second screw hole 65D.

Figures 12A, 12B, 12C:
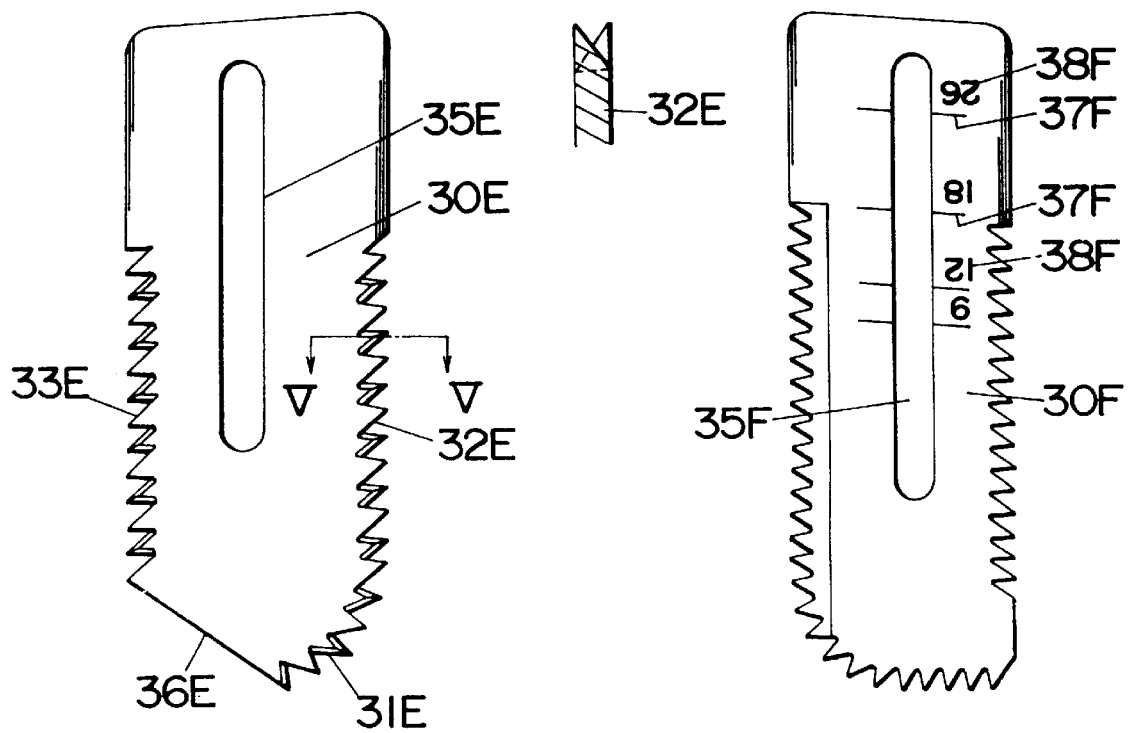
FIG. 12A is a side elevational view of a saw blade having an elongate blade hole of the present invention.
FIG. 12B is a cross-sectional view of a saw tooth at the line V—V of FIG. 12A.
FIG. 12C is a side elevational view of a saw blade having a scale mark around an elongate blade hole thereof of the present invention.

It is also possible to use another embodiment of saw blade 30E having an elongate blade hole 35E, as shown in FIG. 12A, for performing the cutting method of the present invention. Second and third saw tooth sections (32E, 33E) are respectively formed on both sides of the saw blade 30E extending in the longitudinal direction thereof. A rake angle of each of the saw teeth of the second saw tooth section 32E is the opposite rake of each of the saw teeth of the third saw tooth section 33E. Therefore, as described above, a cutting operation of a workpiece in a forward or backward direction of the saw blade 30E can be readily performed without causing vibration of the workpiece during the cutting operation.

In addition, the saw blade 30E further includes a first saw tooth section 31E having arcuately arranged saw teeth that is linked with the second saw tooth section 32E, and a saw tooth-free section 36E that is linearly formed to reduce a repulsion force acting on the saw blade 30E during an initial cutting for effecting a bite in the workpiece by the saw blade 30E. Therefore, it is preferred that the saw blade 30E having the saw tooth-free section 36E be used for a cutting operation of a wood material in which a relatively large repulsion force tends to occur. FIG. 12B shows a cross section of a saw tooth of the second saw tooth section 32E.

Additionally, in case of using a saw blade 30F having scale marks 37F and scale numbers 38F that are drawn along an elongate blade hole 35F, as shown in FIG. 12C, it is possible to readily adjust an effective cutting depth of the saw blade 30F.

Figure 13:
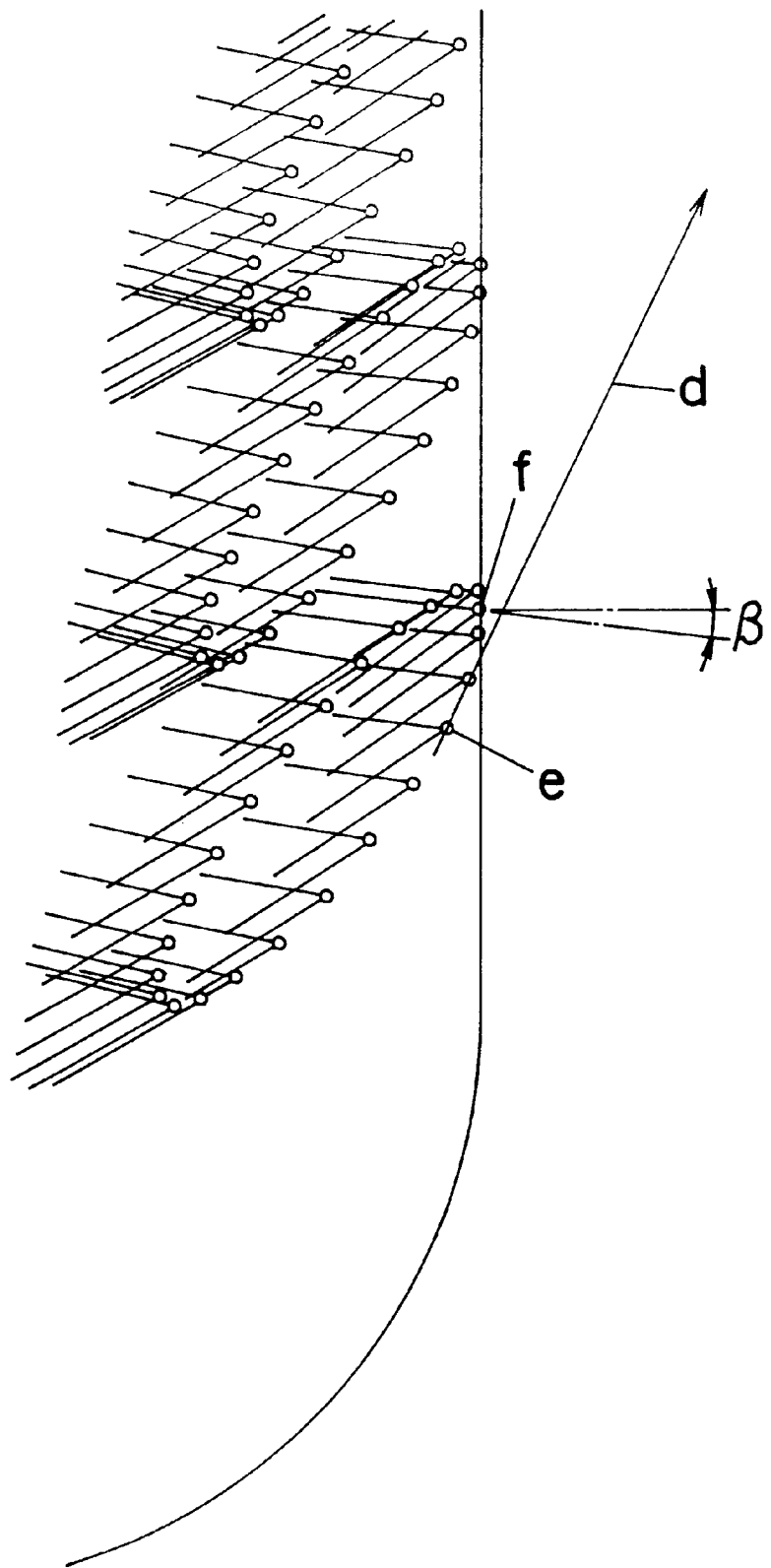
FIG. 13 is a diagram showing an orbit of each point of the saw teeth of the saw blade of FIG. 5A during a cutting operation.
Figure 14:
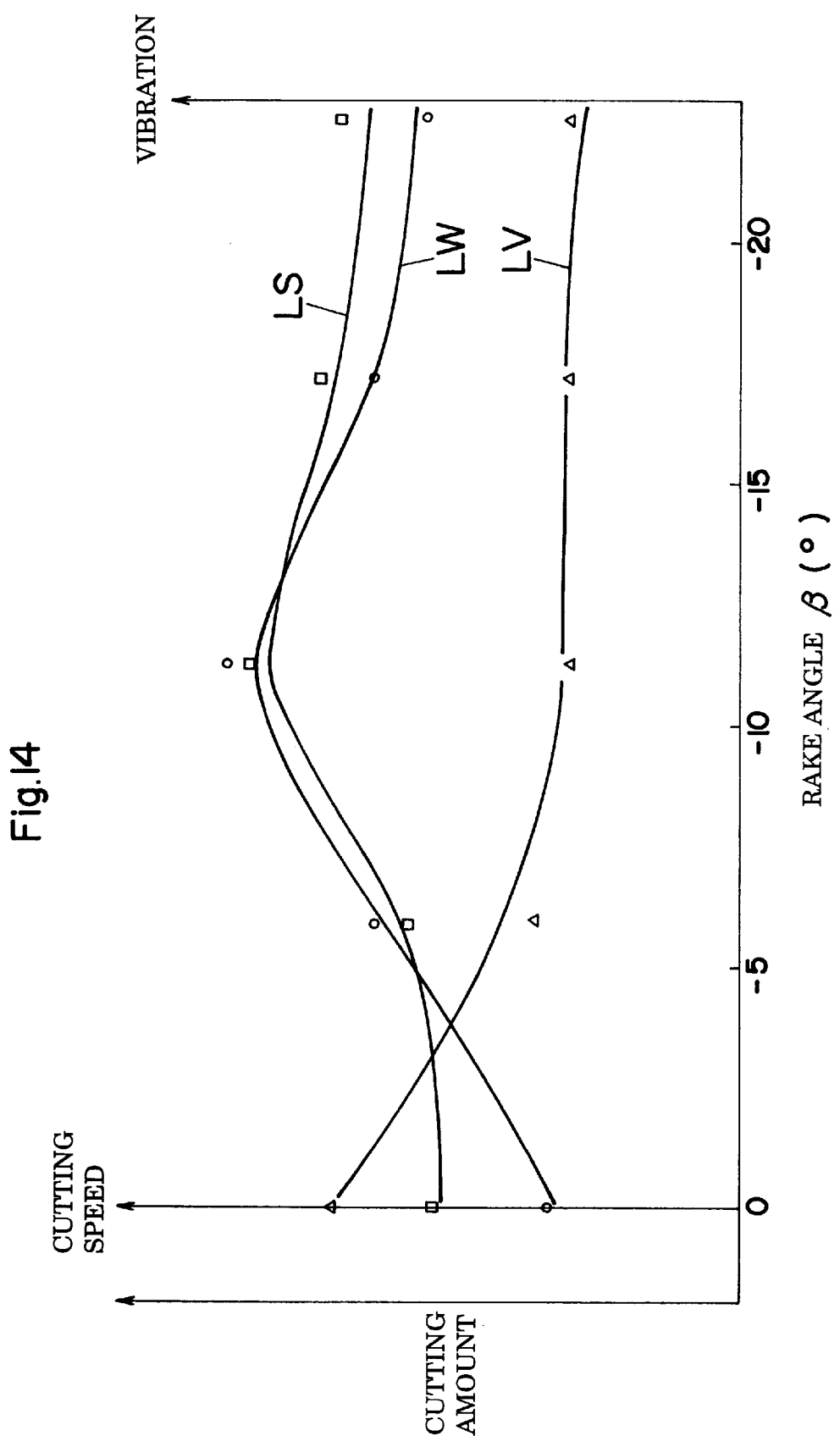
FIG. 14 is a graph illustrating the results of cutting tests for examining an adequate rake angle of saw teeth of a saw blade for cutting a plaster board.

An optimum rake angle $\beta$ of a saw tooth is explained in detail below. When the longitudinal direction of the saw blade 30 is perpendicular to the base 20, the rake angle $\beta$ is defined as the angle between the face of the saw tooth and a horizontal plane parallel to the base 20, as shown in FIG. 5A. Therefore, the rake angle $\beta$ is varied by an attachment angle of the saw blade 30 and the oscillatory angle $\theta$. FIG. 13 illustrates an orbit of each point of the saw teeth of the second saw tooth section 32 of the saw blade 30 of FIG. 5A in case of cutting a workpiece such as a plaster board. In FIG. 13, "d" shows a direction of moving the saw tooth, "e" shows an initial touch point of the saw tooth with the workpiece, and "f" shows a detaching point of the saw tooth from the workpiece. FIG. 14 shows a result of a cutting test, in which a complex material of plaster board and rock wool board was cut with saw blades having some different rake angles $\beta$. In FIG. 14, the line LS extending through "□" marks indicates cutting speed, the line LW extending through "○" marks indicates cutting amount, and the line LV extending through "Δ" marks indicates magnitude of vibration. The cutting amount is defined as an amount of the workpiece cut with a saw blade per one battery 3. In case of cutting the complex material, it is preferred that the rake angle $\beta$ be negative because a higher cutting speed and a larger cutting amount are obtained. In particular, when the rake angle $\beta$ is about $-11°$, maximum cutting speed and cutting amount are obtained. Moreover, vibration is decreased by adopting a negative rake angle, and preferably at about $-12°$. From these results, in case of cutting the plaster board, etc., it is preferred that the optimum rake angle $\beta$ is set in the following range, that is, $0°<\beta<-15°$.

Figure 15:
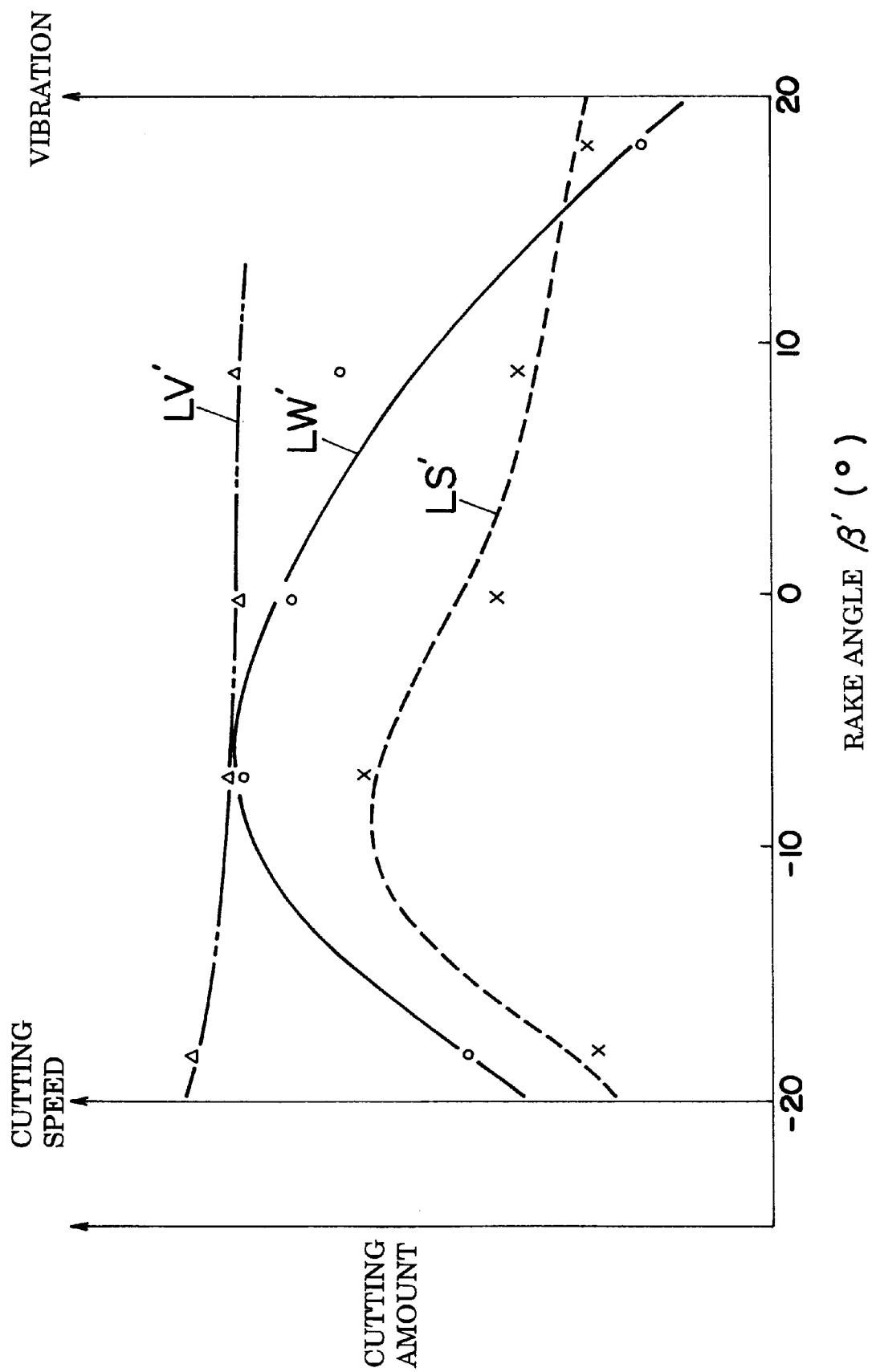
FIG. 15 is a graph illustrating the results of cutting tests for examining an adequate rake angle of saw teeth of a saw blade for cutting a veneer board.

FIG. 15 shows a result of a cutting test, in which a veneer board was cut with saw blades having some different rake angles $\beta'$. Each saw blade is in the form of the saw blade of FIGS. 12A and 12B. In FIG. 15, the line LS' extending through "X" marks indicates cutting speed, the line LW' extending through "○" marks indicates cutting amount, and the line LV' extending through "Δ" marks indicates magnitude of vibration. The cutting amount is defined as an amount of the workpiece cut with a saw blade per one battery 3. In case of cutting veneer board, it is preferred that the rake angle $\beta'$ be negative because a higher cutting speed and a larger cutting amount are obtained. In particular, maximum cutting speed and cutting amount are obtained at about $-8°$ and $-6°$ of the rake angles $\beta'$, respectively. On the other hand, though a change in the vibration is small, it tends to increase at about $-20°$. From these results, in case of cutting veneer board, etc., it is preferred that the optimum rake angle $\beta'$ is determined in the following range, that is, $0°<\beta'<-15°$ from the viewpoint of cutting speed.

Figure 16A:
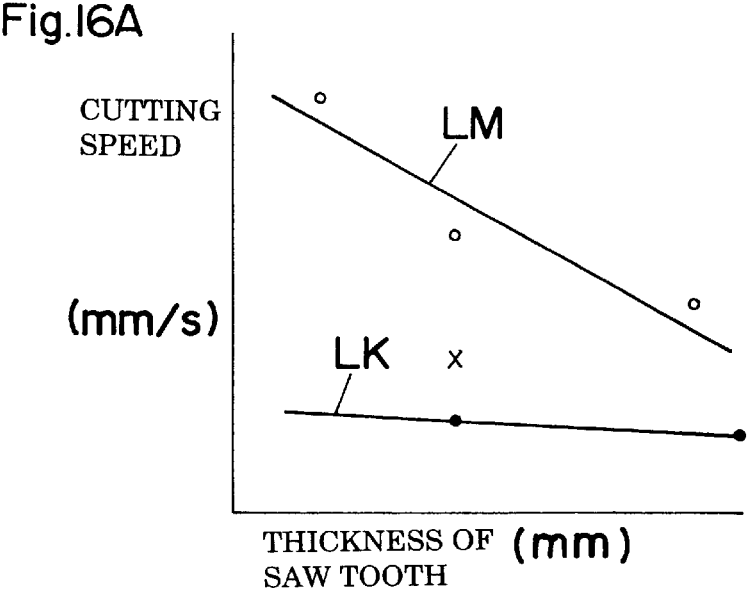
FIGS. 16A and 16B, respectively, show a relation between tooth thickness of a saw blade and cutting speed, and a relation between the tooth thickness and an amount of sawdust produced.
Figure 16B:
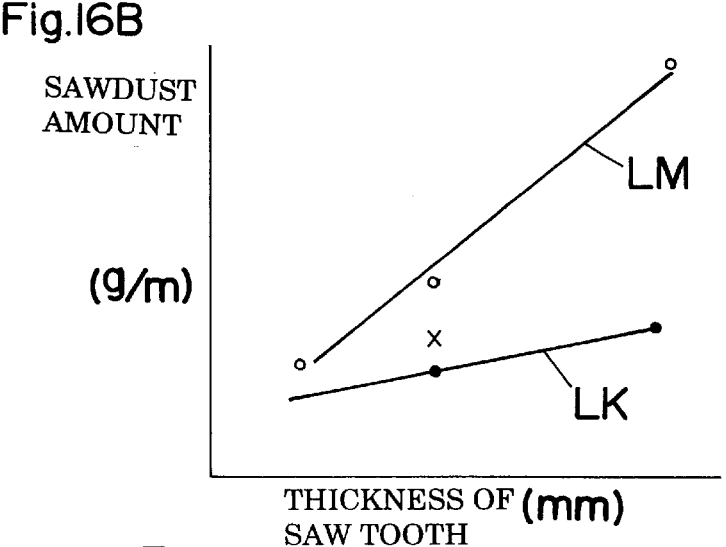
Figure 17A:
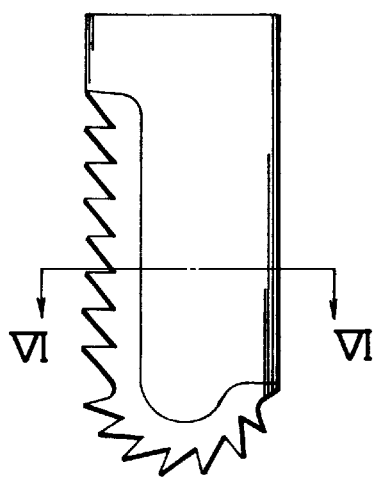
FIGS. 17A and 17B, respectively, are a side elevational view of another embodiment of saw blade of the present invention, and a cross-sectional view of the saw blade at the line VI—VI of FIG. 17A.
Figure 17B:
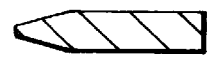

A shape of each of the saw teeth of a saw blade of the present invention is explained in detail below. In case of cutting a workpiece such as a plaster board, etc., a considerable decrease in the volume of the workpiece is observed after a cutting operation of the workpiece. FIGS. 16A and 16B illustrate a relation between thickness of the saw tooth and cutting speed, and a relation between thickness of the saw tooth and amount of sawdust, respectively. In FIGS. 16A and 16B, each of the lines LM extending through "○" marks indicates the relation in case of using a saw blade for the cutting operation, and on the other hand, each of the lines LK extending through "●" marks indicates the relation in case of using a knife blade for the cutting operation. From these relations, though a higher cutting speed is obtained in the cutting operation with the saw blade, a smaller amount of sawdust is obtained in the cutting operation with the knife blade. In FIGS. 16A and 16B, the respective "X" marks indicate cutting speed and amount of sawdust in case of cutting the same workpiece with a saw blade of the present invention shown in FIGS. 17A and 17B. The saw blade of the present invention demonstrates balanced cutting speed and amount of sawdust. FIG. 18 shows a result of a cutting test, in which the workpiece was cut with saw blades having some different top thicknesses t of saw teeth. In FIG. 18, the line LV" extending through "□" marks indicates vibration, the line LD" extending through "○" marks indicates amount of sawdust, the line LW" extending through "Δ" marks indicates cutting amount, and the line LS" extending through "X" indicates cutting speed. The cutting amount is defined as an amount of workpiece cut with a saw blade per one battery 3. In this experiment, the cutting amount was determined by calculating a cutting length from a current value applied to the motor. Since the cutting amount is inversely proportional to cutting load, it can be examined as cutting efficiency though a battery-type electric saw was used in the cutting test. The vibration was measured by a vibration meter attached to the electric saw. The cutting speed is examined as a cutting length per unit of time when the electric saw is moved with a constant feed force to cut the workpiece. In case of "t"=0, that is, using a saw blade having a sharp edge of each of the saw teeth, the cutting operation generates a small amount of sawdust, a small cutting amount, a slow cutting speed, and a large vibration. On the other hand, in case of "t"=T, that is, using the already known saw blade having the same thickness as a top thickness of each of the saw teeth, the cutting operation generates a large amount of sawdust, a large cutting amount, a high cutting speed, and a small vibration. From these results, as a top thickness of each of the saw teeth is thicker, a higher cutting speed, a larger cutting amount, and a smaller vibration are obtained. On the contrary, as the top thickness of each of the saw teeth is thinner, the amount of sawdust is decreased. Therefore, when using the saw blade of the present invention having a trapezoid cross section of each of the saw teeth, it is possible to decrease the amount of sawdust without considerably slowing the cutting speed.

Figure 19:
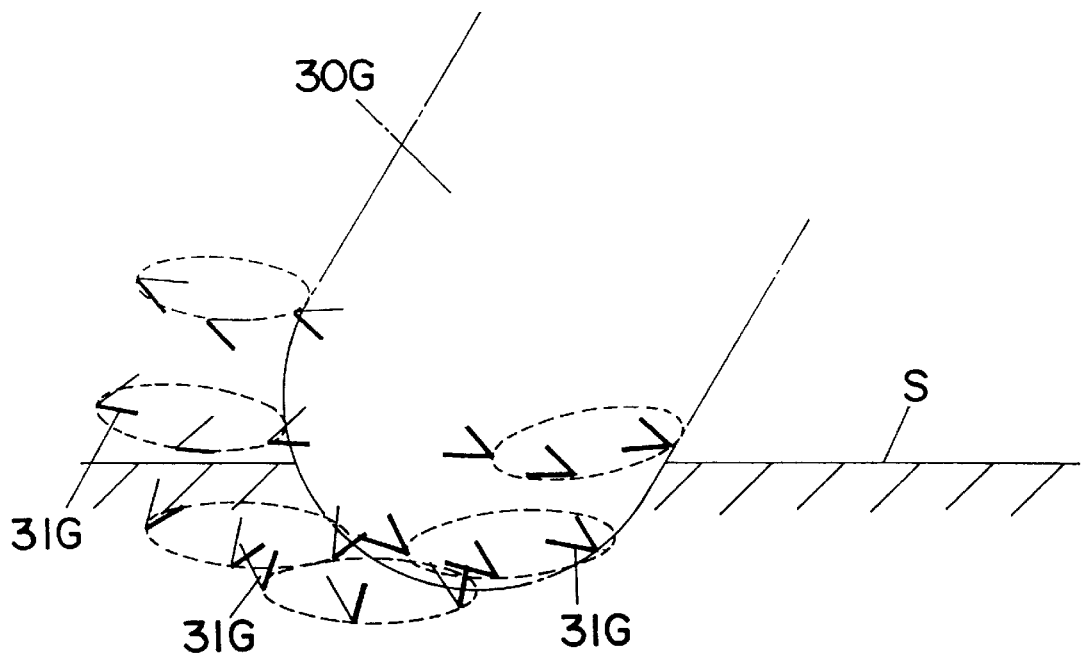
FIG. 19 is a view illustrating an orbit of each point of saw teeth, which are arcuately arranged about an entire end of a saw blade, during a cutting operation.
Figure 20:
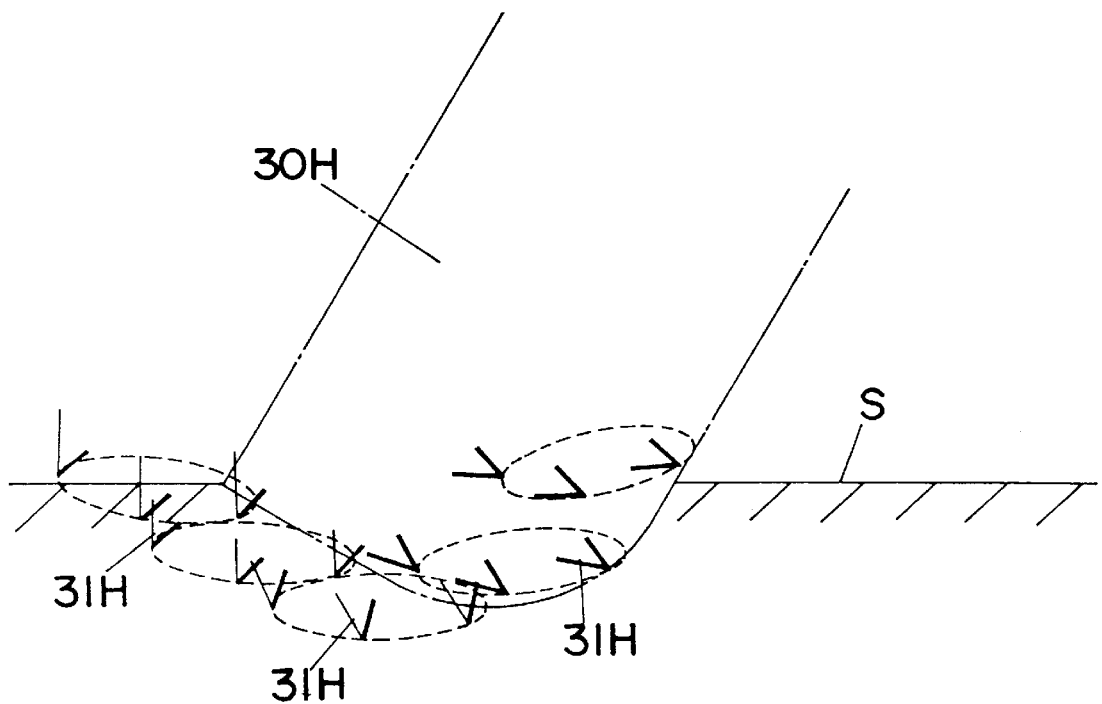
FIG. 20 is a view illustrating an orbit of each point of saw teeth, that are arcuately arranged about part of an end of a saw blade and linearly arranged at the other part of the end thereof, during a cutting operation.
Figure 21B:
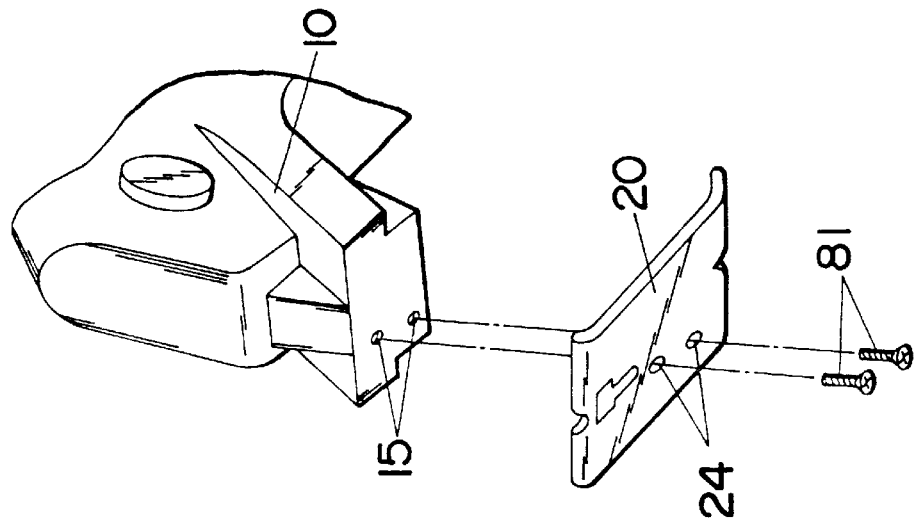
FIGS. 21A and 21B are a perspective view of a base of an electric saw, and an exploded perspective view of the electric saw for explaining how to attach the base to a housing, respectively.
Figure 21A:
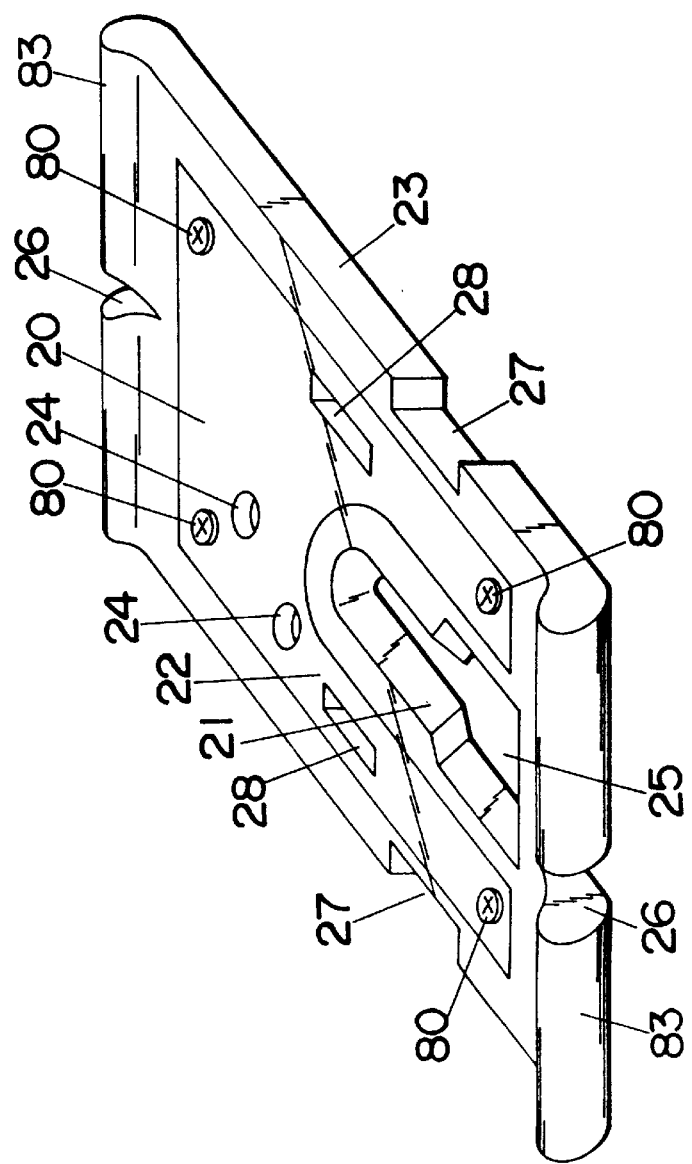

A shape of an end portion of a saw blade of the present invention is explained in detail below. FIG. 19 shows an orbit of each point of saw teeth 31G of a saw blade 30G when a bite is taken in the workpiece S with the saw blade 30G. The saw teeth 31G are arranged at a semicircular end portion of the saw blade 30G. FIG. 20 shows an orbit of each point of saw teeth 31H of a saw blade 30H when a bite is taken in the workpiece S with the saw blade 30H. The saw teeth 31H are arranged at an end portion of the saw blade 30H that consists of an arcuate section and a linear section extending perpendicularly to the longitudinal direction of the saw blade 30H. Since the number of effective saw teeth of the saw blade 30H of FIG. 20 for biting the workpiece S is larger than the number of effective saw teeth of the saw blade 30G of FIG. 19, it is possible to perform a cutting operation more rapidly with the use of the saw blade 30H.

The grip 11 of the electric saw 1 of the present invention has the following advantages. That is, since the motor 2 is enclosed in the motor case 12, the grip 11 can be designed to of a diameter adequate for tightly gripping the grip 11 with the worker's hand. In addition, since heat generated from the motor 2 is hardly transferred to the worker's hand on the grip 11, the worker does not sense an unpleasant feeling during a cutting operation. The grip 11 is also designed so as to place a center of gravity G of the electric saw 1 in the vicinity of the grip 11 gripped by the worker's fingers. Therefore, since the possibility of a moment occurring is minimized, it is possible to perform an accurate cutting operation without causing fatigue of the worker's hand holding the electric saw. In addition, when cutting a workpiece of a ceiling with the electric saw 1, as shown in FIG. 25, since the grip 11 is inclined against the base 20 at an acute angle, fatigue of the worker's hand holding the electric saw during the cutting operation can be effectively prevented. Furthermore, though the power switch 4 is provided at the corner portion between the grip 11 and the motor case 12, it is possible to place the power switch on the grip 11.

The base 20 of the electric saw 1 of the present invention substantially consists of a reinforcing metal plate 22, such as a steel plate, etc., and a synthetic resin plate 23 that contacts with a workpiece during a cutting operation. The synthetic resin plate 23 is connected with the metal plate 22 by an adhesive or screws 80. The base is tightly fixed to the housing 10 by engaging a pair of base screws 81 with screw holes 15 formed in the bottom surface of the housing 10 through a pair of through-holes 24 in the base 20. A slit 21 is formed in the base 20 on the longitudinal center line thereof to project the saw blade 30 downwardly therethrough. Since a sawdust exhausting hole 25 is also formed in the base 20 at a forward position of the slit 21 so as to connect with the slit 21 and be a larger width than the slit 21, it is possible to efficiently exhaust sawdust from the exhausting hole 25, while pressing the base 20 against the workpiece during a cutting operation. In addition, upwardly curved edges 83 are formed on the forward and backward ends of the base 20, respectively. A notch 26 is also formed in each curved edge 83 for readily setting the saw blade 30 on a cutting line drawn on the workpiece.

Figure 26A:
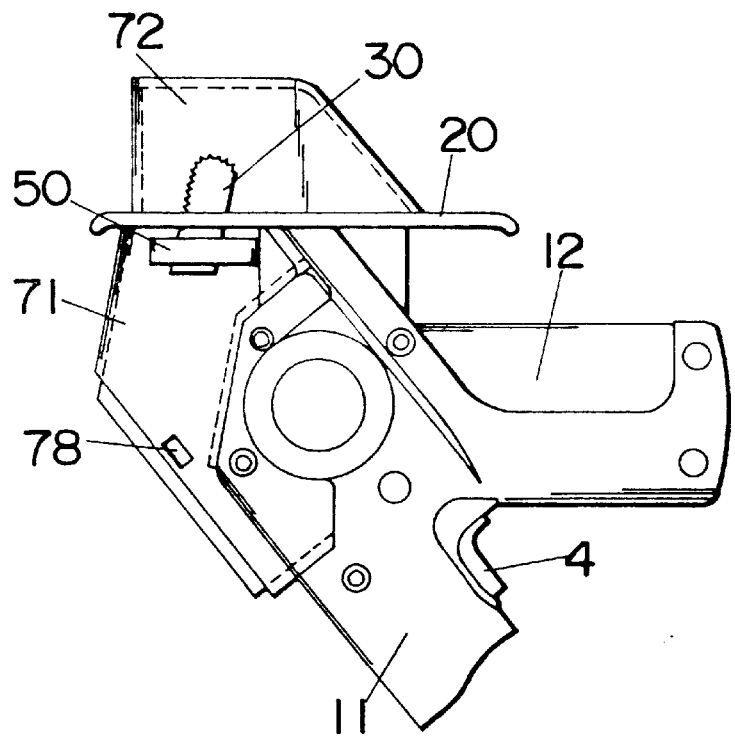
FIG. 26A is a fragmentary side elevational view of the electric saw with the detachable cover attached to the base.
Figure 26B:
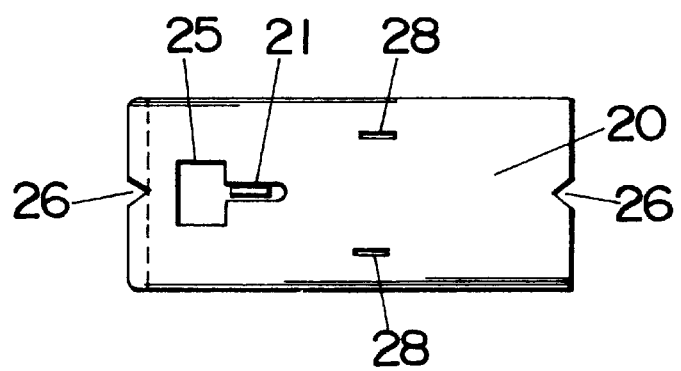
FIG. 26B is a bottom view of the base.
Figure 26C:
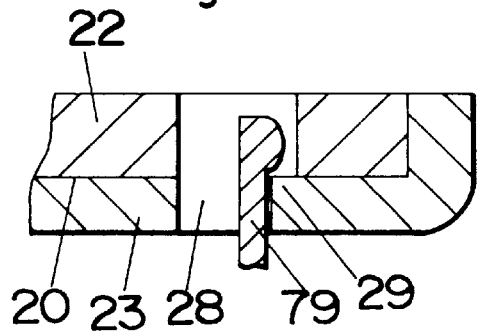
FIG. 26C is a partially cross-sectional view of an engaging portion of the detachable cover with the base; and In FIGS. 27A to 27C.
Figure 27A:
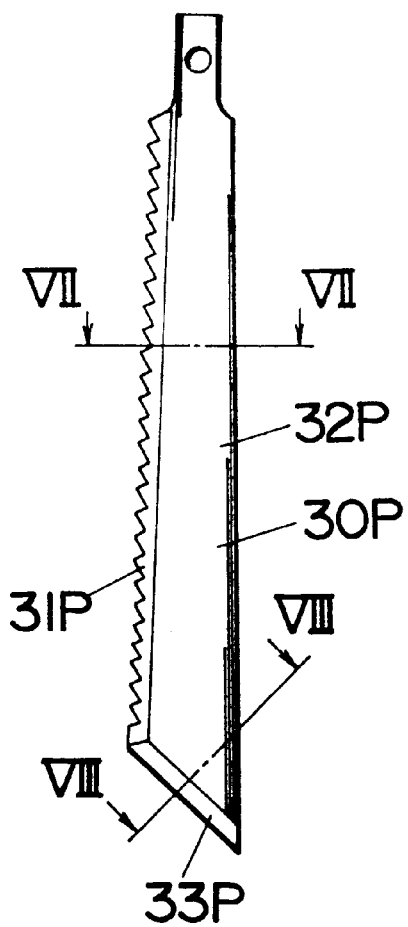
FIG. 27A is a side elevational view of a saw blade of the prior art.
Figure 27B:
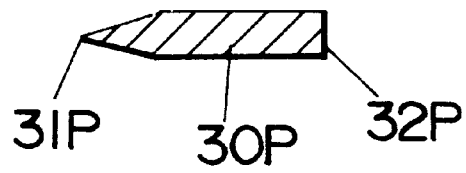
FIG. 27B is a cross-sectional view of the saw blade at the line VII—VII of FIG. 27A.
Figure 27C:
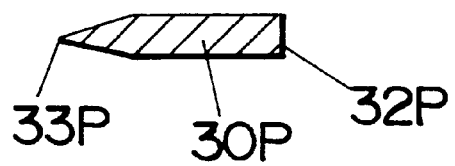
FIG. 27C is a cross-sectional view of the saw blade at the line VIII—VIII of FIG. 27A.

When cutting the workpiece of a ceiling with the electric saw 1 of the present invention, a transparent sawdust case 70 made of a transparent synthetic resin is attached to the electric saw 1. The sawdust case 70 consists of a tubular case 71 attached to the electric saw 1 and a cover 72 detachably attached to the tubular case 71 for storing the sawdust. The tubular case 71 is attached to the electric saw 1 by attachment screws 82 passing through screw holes 73 so as to abut a lower opening 74 of the tubular case 71 on a surface of the forward end portion 13 of the housing 10. A pair of hook engaging holes 78 are formed in the tubular case 71 around an upper opening 76 of the tubular case. On the other hand, the cover 72 has a pair of hooks 79 extending from the circumference of an opening thereof. As shown in FIG. 24, the cover 72 is detachably attached to the tubular case 71 by engaging the hooks 79 with the hook engaging holes 78 of the tubular case 71. When cutting a workpiece Q of a ceiling by advancing the electric saw 1 with the sawdust case 70 of the present invention in the direction of the arrow in FIG. 25, sawdust is exhausted to the sawdust case 70 through the sawdust exhausting hole 25 of the base 20, and stored in the cover 72. The cover 72 is detached from the tubular case 71 to discard the sawdust stored therein. Since the workpiece is cut with the electric saw 1 while observing a cutting condition of the workpiece by the worker's eyes through the transparent sawdust case 70, it is possible to provide an accurate and smooth cutting operation. As shown in FIGS. 26B and 26C, a pair of rectangular through-holes 28 having hook engaging portions 29 therein is formed in the base 20 such that the hooks 79 of the cover 72 are engaged with the engaging portions 29. When the worker is not using the electric saw, the cover 72 is detached from the tubular case 71, and the cover 72 is attached to the base 20 by engaging the hooks 79 of the cover 72 with the hook engaging portions 29 of the base 20 to protect the saw blade 30 projecting from the base 20. Thus protected saw blade 30 by the cover 72 presents safe custody and carrying of the electric saw 1.

INDUSTRIAL APPLICABILITY

As described above, a cutting method for forming a window-like hole in a workpiece with an electric saw of the present invention comprises the steps of taking a bite in the workpiece with a first saw tooth section formed on a leading end of a saw blade by giving a reciprocating orbital motion to the saw blade, while pressing a leading end of a base and the leading end of the saw blade against the workpiece, continuously penetrating the saw blade through the workpiece, and subsequently cutting the workpiece with a second saw tooth section formed on one side of the saw blade by advancing the saw blade along a cutting line on the workpiece. Therefore, it is possible to form the window-like hole accurately and rapidly in the workpiece without drilling a starting through-hole in the workpiece.

What is claimed is:

1. A saw tool for cutting a board workpiece having at least one planar surface with a saw blade having a reciprocating orbital stroke while moving a base of said saw tool along said planar surface of said workpiece, said saw tool comprising a housing containing an elongated grip having a longitudinal axis said base being fixedly attached to said housing and having a slit therein, drive means enclosed in said housing, except for said grip, and connected to a driving arm to effect a reciprocating orbital motion therein, and said saw blade having one end attached to said driving arm and its other end extending through said slit in said base, said grip on said housing being a solitary grip which extends at an acute angle with respect to said base such that said longitudinal axis of said grip intersects a forward end of said base, said saw blade being of a length to dispose said saw blade on a side of said base opposite that on which said driving arm is disposed during the entire orbital stroke thereof, said saw blade being defined by substantially parallel sides and an end portion connecting said sides at said other end, a first saw tooth section formed on said saw blade end portion and containing an edge of arcuate shape having saw teeth disposed thereon to establish a bite between said saw blade and said workpiece when said forward end of said base and said arcuate edge of said blade are pressed against said planar surface of said workpiece and said tool is moved to pivot said base about said forward end thereof, and a second saw tooth section being formed on one side of said blade and containing saw teeth particularly shaped to facilitate cutting of said workpiece when said saw tool is moved in one linear direction along said workpiece surface.

2. A saw tool for cutting a workpiece having at least one planar surface with a saw blade having a reciprocating orbital stroke while moving a base of said saw tool along said planar surface of said workpiece, said saw tool comprising a housing containing an elongated grip having a longitudinal axis and being fixedly attached to said base, said base having a slit therein, drive means enclosed in said housing except for said grip, and connected to a driving arm to effect a reciprocating orbital motion therein, and said saw blade having one end attached to said driving arm and its other end extending through said slit in said base, said grip on said housing being a solitary grip which extends at an acute angle with respect to said base such that said longitudinal axis of said grip intersects a forward end of said base, said saw blade being of a length to dispose said saw blade on a side of said base opposite that on which said driving arm is disposed during the entire orbital stroke thereof, said saw blade being defined by substantially parallel sides and an end portion connecting said sides at said other end, a first saw tooth section being formed on said end portion and containing a linear edge inclined against said one side of said saw blade to establish a bit between said saw blade and said workpiece when said forward end of said base and said linear edge of said blade are pressed against said workpiece and said tool is moved to pivot said base about said forward end thereof, and a second saw tooth section being formed on said one side of said blade and containing saw teeth particularly shaped to facilitate cutting of said workpiece when said saw tool is moved in one linear direction along said workpiece surface.

3. A saw tool as set forth in claim 1, wherein a third saw tooth section is formed on the opposite side of said blade from said second saw tooth section and contains saw teeth particularly shaped to facilitate cutting of said workpiece when said saw tool is moved in the opposite linear direction along said workpiece surface.

4. A saw tool as set forth in claim 2, wherein a third saw tooth section is formed on the opposite side of said blade from said second saw tooth section and contains saw teeth particularly shaped to facilitate cutting of said workpiece when said saw tool is moved in the opposite linear direction along said workpiece surface.

* * * * *